United States Patent
Takano

(10) Patent No.: US 10,212,698 B2
(45) Date of Patent: Feb. 19, 2019

(54) DEVICE FOR PERFORMING WIRELESS COMMUNICATION

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 15/122,361

(22) PCT Filed: Jan. 29, 2015

(86) PCT No.: PCT/JP2015/052585
§ 371 (c)(1),
(2) Date: Aug. 29, 2016

(87) PCT Pub. No.: WO2015/141293
PCT Pub. Date: Sep. 24, 2015

(65) Prior Publication Data
US 2016/0374057 A1    Dec. 22, 2016

(30) Foreign Application Priority Data

Mar. 18, 2014  (JP) .................................. 2014-055144

(51) Int. Cl.
*H04W 72/04*  (2009.01)
*H04W 84/12*  (2009.01)
(Continued)

(52) U.S. Cl.
CPC ......... *H04W 72/042* (2013.01); *H04W 16/14* (2013.01); *H04W 72/0453* (2013.01);
(Continued)

(58) Field of Classification Search
CPC ........ H04L 5/14; H04W 16/14; H04W 48/12; H04W 72/042; H04W 72/0453;
(Continued)

(56) References Cited

U.S. PATENT DOCUMENTS

2006/0040666 A1\* 2/2006 Narasimha ............ H04W 36/30
455/436
2008/0232335 A1    9/2008 Del Prado Pavon et al.
(Continued)

FOREIGN PATENT DOCUMENTS

JP    2006-94001 A    4/2006
JP    2014-49931 A    3/2014
(Continued)

OTHER PUBLICATIONS

Extended European Search Report dated Oct. 9, 2017 in Patent Application No. 15764922.9.
(Continued)

*Primary Examiner* — Robert J Lopata
(74) *Attorney, Agent, or Firm* — Xsensus LLP

(57) ABSTRACT

[Object] To enable a frequency band shared between wireless communication of a cellular system and wireless communication conforming to a wireless LAN standard to be more appropriately used in the cellular system.

[Solution] There is provided a device including an acquisition unit configured to acquire information indicating a terminal device which is a device candidate for performing wireless communication of a cellular system using a frequency band shared between the wireless communication of the cellular system and wireless communication conforming to a wireless local area network (LAN) standard, and a control unit configured to notify the terminal device that the terminal device is the device candidate.

26 Claims, 24 Drawing Sheets

(51) Int. Cl.
*H04W 16/14* (2009.01)
*H04W 88/06* (2009.01)
*H04L 5/14* (2006.01)
*H04W 48/12* (2009.01)
*H04W 88/10* (2009.01)

(52) U.S. Cl.
CPC .............. *H04W 84/12* (2013.01); *H04L 5/14* (2013.01); *H04W 48/12* (2013.01); *H04W 88/06* (2013.01); *H04W 88/10* (2013.01)

(58) Field of Classification Search
CPC . H04W 72/1215; H04W 84/12; H04W 88/06; H04W 88/10
USPC ........................................................ 370/329
See application file for complete search history.

(56) References Cited

U.S. PATENT DOCUMENTS

| | | |
|---|---|---|
| 2011/0319085 A1 | 12/2011 | Ishii et al. |
| 2012/0307748 A1 | 12/2012 | Cheng et al. |
| 2013/0054723 A1 | 2/2013 | Jo et al. |
| 2013/0156019 A1* | 6/2013 | Chen .................. H04W 72/1215 370/338 |
| 2013/0203458 A1* | 8/2013 | Charbit ................. H04W 52/34 455/522 |
| 2013/0336156 A1 | 12/2013 | Wei et al. |
| 2014/0023022 A1 | 1/2014 | Cheng et al. |
| 2014/0128088 A1* | 5/2014 | Farhadi ................. H04W 16/16 455/452.1 |
| 2014/0199991 A1* | 7/2014 | Mukherjee .......... H03M 13/612 455/422.1 |
| 2014/0254524 A1 | 9/2014 | Cheng et al. |
| 2015/0043456 A1* | 2/2015 | Rikkinen ............. H04B 1/7143 370/329 |
| 2015/0043520 A1* | 2/2015 | Sun ......................... H04L 5/001 370/330 |
| 2015/0043687 A1* | 2/2015 | Luo ........................ H04B 1/006 375/349 |
| 2015/0078346 A1* | 3/2015 | Farhadi ................. H04W 16/14 370/336 |
| 2015/0156650 A1 | 6/2015 | Li et al. |
| 2015/0195849 A1* | 7/2015 | Bashar .................. H04W 16/14 370/330 |
| 2015/0208253 A1* | 7/2015 | Kim ...................... H04W 24/02 370/252 |
| 2015/0222410 A1 | 8/2015 | Belghoul et al. |
| 2015/0223077 A1* | 8/2015 | Fan ....................... H04W 16/14 370/312 |
| 2015/0223243 A1* | 8/2015 | Tabet .................. H04W 28/085 370/330 |
| 2015/0257116 A1* | 9/2015 | Frantti ................. H04W 60/06 370/253 |
| 2015/0296384 A1* | 10/2015 | Sadek ................... H04W 16/14 455/452.1 |
| 2016/0014797 A1 | 1/2016 | Cheng et al. |
| 2016/0014798 A1 | 1/2016 | Cheng et al. |
| 2016/0157233 A1 | 6/2016 | Bai et al. |
| 2016/0242200 A1* | 8/2016 | Yan .................... H04W 72/1263 |
| 2017/0041912 A1* | 2/2017 | Tanaka ................. H04W 16/14 |
| 2017/0164218 A1* | 6/2017 | Ni ......................... H04W 48/18 |
| 2017/0222763 A1* | 8/2017 | Lee ........................... H04L 1/18 |

FOREIGN PATENT DOCUMENTS

| | | |
|---|---|---|
| WO | 2012/148482 A1 | 11/2012 |
| WO | WO 2013/143053 A1 | 10/2013 |

OTHER PUBLICATIONS

Combined Search Report and Written Opinion dated Aug. 24, 2017 in Singaporean Patent Application No. 11201607462Y.
RP-140060, "Summary of a workshop on LTE in Unlicensed Spectrum", Huawei, Ericsson, Qualcomm, CMCC, Verizon, 3GPP TSG RAN Meeting #63, Agenda Item: 31.1, Total 4 Pages, (Mar. 3-6, 2014).
International Search Report dated Apr. 7, 2015 in PCT/JP15/052585 Filed Jan. 29, 2015.

* cited by examiner

DEVICE FOR PERFORMING WIRELESS COMMUNICATION

TECHNICAL FIELD

The present disclosure relates to a device.

BACKGROUND ART

In the 3$^{rd}$ Generation Partnership Project (3GPP), various technologies for improving system throughput have been discussed. It may be said that a first shortcut for improving the system throughput is increasing a frequency to be used. In the 3GPP, the technology of carrier aggregation (CA) has been considered in Release 10 and Release 11. CA is a technology for improving the system throughput and a maximum data rate by aggregating component carriers (CCs) having a bandwidth of 20 MHz for use. A frequency band available as a CC must adopt the technology of such CA. Thus, a frequency band available for wireless communication of a cellular system is required.

For example, in Patent Literature 1, technology which enables a registered frequency band available for a registered provider and an unlicensed band available when a predetermined condition is satisfied to be used in addition to a dedicated frequency band allocated to each provider for exclusive use is disclosed.

CITATION LIST

Patent Literature

Patent Literature 1: JP 2006-094001A

SUMMARY OF INVENTION

Technical Problem

However, for example, even when a frequency band to be used in wireless communication of a wireless local area network (LAN) is also used in wireless communication of a cellular system, the above-mentioned frequency band is not likely to be appropriately used in wireless communication of the above-mentioned cellular system.

An example in which the cellular system uses the above-mentioned frequency band on the basis of carrier sense multiple access with collision avoidance (CSMA/CA) is considered. However, because the CSMA/CA is a mechanism for simultaneously enabling only one-to-one communication, undesirable results can be caused when the CSMA/CA is applied as is to a cellular system in which a frequency band is used simultaneously by one base station and a plurality of terminal devices. For example, the wireless communication of the cellular system is performed in a state in which no hidden terminal problem is solved.

Therefore, it is desirable to provide a mechanism which enables a frequency band shared between wireless communication of a cellular system and wireless communication conforming to a wireless LAN standard to be more appropriately used in the cellular system.

Solution to Problem

According to the present disclosure, there is provided a device including: an acquisition unit configured to acquire information indicating a terminal device which is a device candidate for performing wireless communication of a cellular system using a frequency band shared between the wireless communication of the cellular system and wireless communication conforming to a wireless local area network (LAN) standard; and a control unit configured to notify the terminal device that the terminal device is the device candidate.

According to the present disclosure, there is provided a device including: a recognition unit configured to recognize that a terminal device is a device candidate for performing wireless communication of a cellular system using a frequency band shared between the wireless communication of the cellular system and wireless communication conforming to a wireless local area network (LAN) standard through a notification by a base station of the cellular system; and a control unit configured to perform control for using the frequency band in the wireless communication of the cellular system when the terminal device is the device candidate.

Advantageous Effects of Invention

According to the above-described present disclosure, a frequency band shared between wireless communication of a cellular system and wireless communication conforming to a wireless LAN standard can be more appropriately used in the cellular system. Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Figure 1:
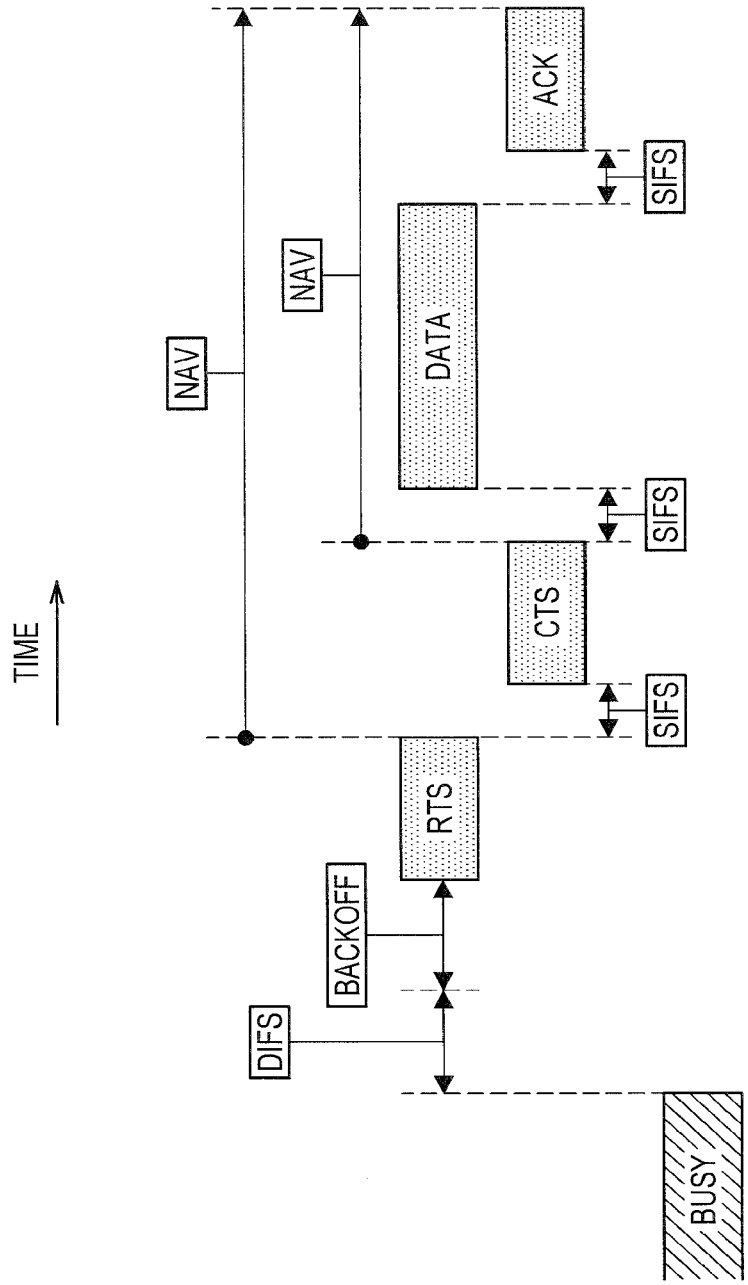
FIG. 1 is an explanatory diagram illustrating a frame format of Institute of Electrical and Electronics Engineers (IEEE) 802.11.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, the description will be given in the following order.
1. Introduction
2. Schematic configuration of system
3. Configuration of each device
3.1. Configuration of base station
3.2. Configuration of terminal device
4. Flow of process
5. First modified example
6. Second modified example
7. Application example
7.1. Application example related to base station
7.2. Application example related to terminal device
8. Conclusion
<<1. Introduction>>

Figure 2:
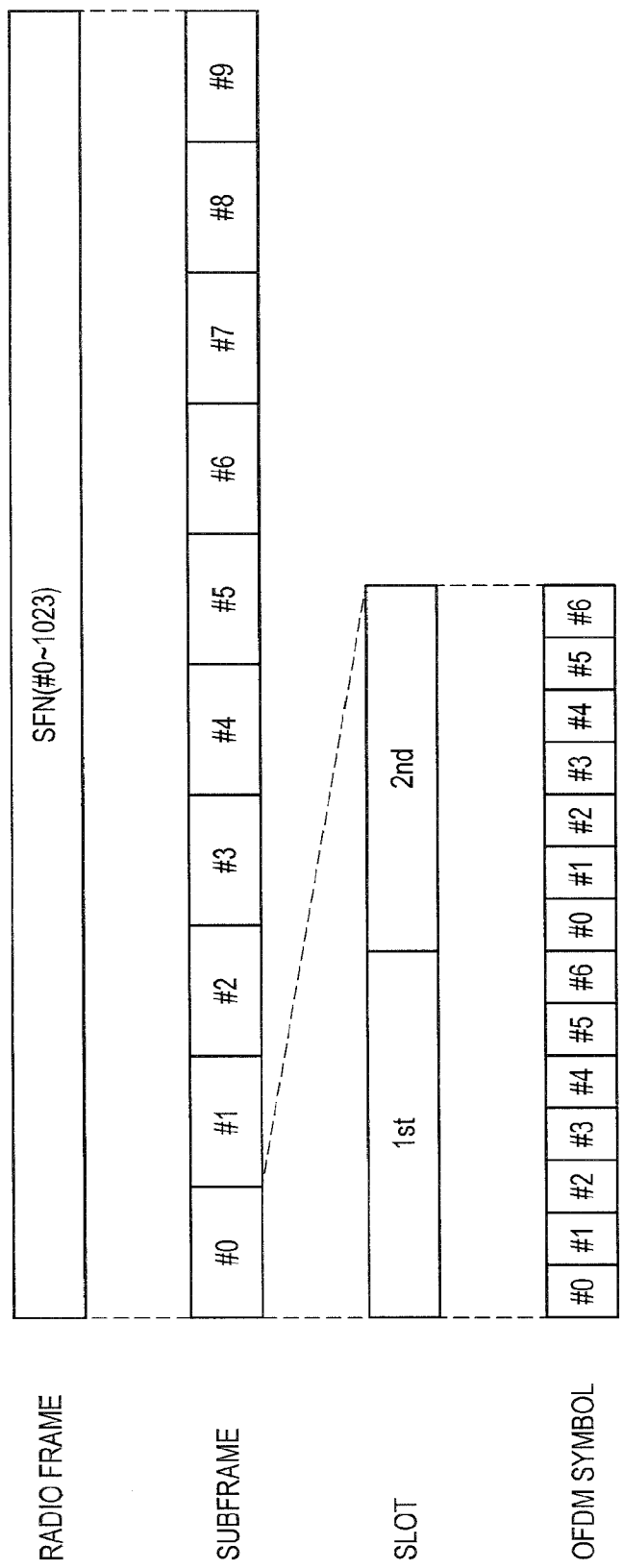
FIG. 2 is an explanatory diagram illustrating a frame format of long-term evolution (LTE).

First, sharing of a frequency band, technology of wireless communication conforming to a wireless local area network (LAN) standard, and technology of wireless communication of a cellular system will be described with reference to FIGS. 1 and 2.

(Sharing of Frequency Band)

A frequency band available for the wireless communication of the cellular system is required. For example, a band of 5 GHz is considered as a frequency band for use in wireless communication of the cellular system (hereinafter referred to as "cellular communication").

However, the band of 5 GHz is used in wireless communication conforming to the wireless LAN standard (hereinafter referred to as "wireless LAN communication"). Thus, when the cellular system uses the band of 5 GHz, for example, the band of 5 GHz is shared between cellular communication and wireless LAN communication. Specifically, for example, a frequency band of 5GHz (for example, a channel of a wireless LAN) is used in the wireless LAN communication at a certain time and used in the cellular communication at another time. Thereby, frequency utilization efficiency of the band of 5 GHz is improved. Also, the wireless LAN standard includes Institute of Electrical and Electronics Engineers (IEEE) 802.11a, 11b, 11g, 11n, 11ac, and 11ad, etc. and these standards are characterized in that IEEE 802.11 is adopted for a media access control (MAC) layer.

Devices for performing wireless LAN communication are already widespread in the world. Thus, from the viewpoint of backward compatibility, a mechanism for sharing a frequency band between cellular communication and wireless LAN communication without changing an operation of the device for performing the wireless LAN communication is considered as the technology of Long Term Evolution (LTE) and is desired to be defined as a new standard of LTE. Also, a terminal device conforming to the above-mentioned new standard uses the shared frequency band, but a terminal device which does not conform to the above-mentioned new standard is considered as a terminal device not using the shared frequency band.

In LTE, LTE-Advanced, or a cellular system conforming to a communication standard equivalent thereto, the shared frequency band will be used as, for example, a component carrier (CC). Further, it is assumed that the frequency band of the cellular system is used as a primary component carrier (PCC) and the shared frequency band is used as a secondary component carrier (SCC). Also, a control signal and a data signal can be transmitted and received using a frequency band of the cellular system and the data signal can be transmitted and received using the shared frequency band.

(Technology of Wireless Communication Conforming to Wireless LAN Standard)

A frame format of IEEE 802.11 will be described as the technology of wireless communication conforming to the wireless LAN standard with reference to FIG. 1. FIG. 1 is an explanatory diagram illustrating a frame format of IEEE 802.11.

In IEEE 802.11, a DATA frame and an acknowledgement (ACK) frame are basic frames. When the DATA frame is correctly received, the ACK frame is a frame which causes a transmitting side to know the success of reception of the DATA frame. Although wireless LAN communication can be performed only by the DATA frame and the ACK frame, two frames such as a request to send (RTS) frame and a clear to send (CTS) frame are generally further used.

Before the RTS frame is transmitted, each terminal device which performs the wireless LAN communication confirms that no signal is transmitted during a period referred to as a distributed coordination function (DCF) inter-frame space (DIFS). This is referred to as carrier sense. When terminal devices simultaneously start to transmit signals at a point in time at which the DIFS has elapsed, the signals may collide with each other. Thus, each terminal device waits for a backoff time randomly set for each terminal device and transmits a signal if no signal is transmitted for the backoff time.

Basically, the terminal device cannot transmit the signal while any signal is detected. However, because there is a hidden terminal problem, an RTS frame and a CTS frame including a duration field for setting a value referred to as a network allocation vector (NAV) are added. The NAV is set on the basis of a value included in the duration field. The terminal device setting the NAV avoids transmitting a signal during a period of the NAV.

First, a first terminal device for transmitting the DATA frame transmits the RTS frame. Then, another terminal device located around the first terminal device receives the RTS frame and acquires a value included in the duration field in the RTS frame. The other terminal device sets, for example, its own NAV to the above-mentioned acquired value and avoids transmitting a signal during the period of the NAV. For example, the period of the NAV is a period from the end of the RTS frame to the end of the ACK frame.

Also, a second terminal device for receiving the DATA frame transmits the CTS frame after only a short inter-frame space (SIFS) from the end of the RTS frame according to the reception of the RTS frame. Then, another terminal device located around the above-mentioned second terminal device receives the CTS frame and acquires a value included in the duration field in the CTS frame. The other terminal device sets, for example, its own NAV to the above-mentioned acquired value and avoids transmitting a signal during the period of the NAV. The period of the NAV is a period from the end of the CTS frame to the end of the ACK frame. Thereby, for example, it is possible to prevent the other terminal device (that is, a hidden terminal for the above-mentioned first terminal device) close to the above-mentioned second terminal device without being close to the above-mentioned first terminal device from transmitting a signal during communication of the above-mentioned first terminal device and the above-mentioned second terminal device.

Also, the RTS frame includes a frame control field, a reception address field, a transmission address field, and a frame check sequence (FCS) in addition to the duration field. Also, the CTS frame includes a frame control field, a reception address field, and an FCS in addition to the duration field.

Also, the DIFS and the SIFS in the standard of the IEEE 802.11 series have, for example, the following lengths.

TABLE 1

|  | 802.11b | 802.11g | 802.11a | 802.11n | 802.11ac |
| --- | --- | --- | --- | --- | --- |
| SIFS | 10 us | 10 us | 16 us | 16 us | 16 us |
| DIFS | 50 us | 28 us | 34 us | 34 us | 34 us |

(Technology of Wireless Communication of Cellular System)

(a) Frame Format

The frame format of LTE will be described with reference to FIG. 2. FIG. 2 is an explanatory diagram illustrating the frame format of LTE.

First, a unit of time such as a radio frame is used in LTE. One radio frame is 10 ms. Each radio frame is identified by a system frame number (SFN) which is any one of 0 to 1023.

The radio frame includes 10 sub-frames identified by #0 to #9. Each sub-frame is 1 ms. Further, each sub-frame includes two slots and each slot includes, for example, seven orthogonal frequency division multiplexing (OFDM) symbols. That is, each sub-frame includes 14 OFDM symbols. Also, the frame format illustrated in FIG. 2 is a frame format of a downlink and the frame format of an uplink includes a single carrier frequency division multiple access (SC-FDMA) symbol in place of an OFDM symbol.

(b) Carrier Aggregation

Component Carriers

With carrier aggregation in Release 10, up to a maximum of five CCs are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE.

Since the PCC is the most important CC among the multiple CCs, it is desirable for the PCC to be the CC with the most stable communication quality. Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs.

(Conditions of Backhauling for Carrier Aggregation)

For example, an ACK of a downlink signal on an SCC is transmitted by the PUCCH of the PCC. Since the ACK is used for the retransmission of data by the evolved Node B (eNB), a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

<<2. Schematic Configuration of Cellular System>>

Figure 3:
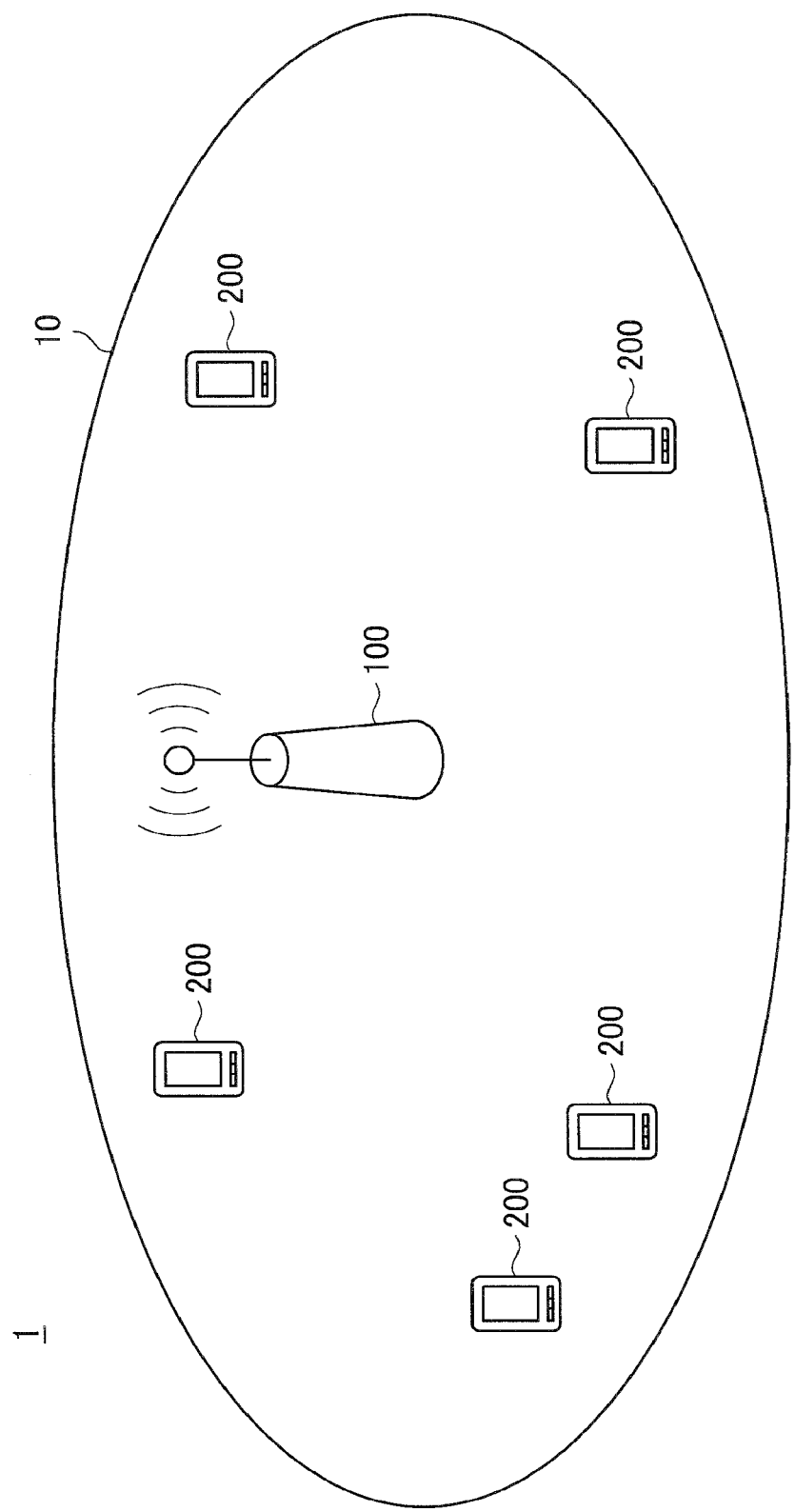
FIG. 3 is an explanatory diagram illustrating an example of a schematic configuration of a cellular system according to an embodiment of the present disclosure.

Next, a schematic configuration of a cellular system 1 according to an embodiment of the present disclosure will be described with reference to FIGS. 3 to 5. FIG. 3 is an explanatory diagram illustrating an example of the schematic configuration of the cellular system 1 according to the embodiment of the present disclosure. Referring to FIG. 3, the system 1 includes a base station 100 and a terminal device 200. The cellular system 1 is, for example, LTE, LTE-Advanced, or a system conforming to a communication standard equivalent thereto.

(Base Station 100)

The base station 100 performs wireless communication (cellular communication) of the cellular system 1. That is, the base station 100 performs wireless communication with the terminal device 200. For example, the base station 100 performs wireless communication with the terminal device 200 located within a cell 10 which is a communication area of the base station 100. Specifically, for example, the base station 100 transmits a downlink signal to the terminal device 200 and receives an uplink signal from the terminal device 200.

As an example, the base station 100 is a small base station and the cell 10 is a small cell. As another example, the base station 100 may be a macro base station and the cell 10 may be a macro cell.

(Terminal Device 200)

The terminal device 200 performs wireless communication (cellular communication) of the cellular system.

For example, the terminal device 200 performs wireless communication with the base station 100. For example, when the terminal device 200 is located within the cell 10 of the base station 100, the terminal device 200 performs wireless communication with the base station 100. Specifically, for example, the terminal device 200 receives the downlink signal from the base station 100 and transmits the uplink signal to the base station 100.

Also, the terminal device 200 can perform wireless communication with another terminal device (for example, another terminal device 200 or the like). For example, the terminal device 200 can perform device-to-device (D2D) communication. Also, the terminal device 200 can perform wireless communication within a localized network (LN) formed by the terminal device.

Also, the terminal device 200 may perform other wireless communication. For example, the terminal device 200 may perform wireless communication (wireless LAN communication) conforming to the wireless LAN standard.

(Frequency Band to be Used)

In wireless communication (that is, cellular communication) of the cellular system 1, the frequency band of the cellular system 1 (hereinafter referred to as a "cellular band") is used. The cellular band is, for example, a band allocated to a provider of the cellular system 1, and can be referred to as a licensed band.

Particularly, in the embodiment of the present disclosure, a frequency band to be used in wireless communication (that is, wireless LAN communication) conforming to a wireless LAN standard is also used in cellular communication. That is, a frequency band shared between the cellular communication and the wire LAN communication (hereinafter referred to as a "shared band"). The above-mentioned shared band is, for example, a channel of a wireless LAN. As an example, the shared band is the channel of 20 MHz.

(Wireless LAN)

A communication area of the wireless LAN can be located within the cell 10. That is, the cell 10 can overlap the communication area of the wireless LAN. Hereinafter, in this regard, a specific example will be described with reference to FIGS. 4 and 5.

Figure 4:
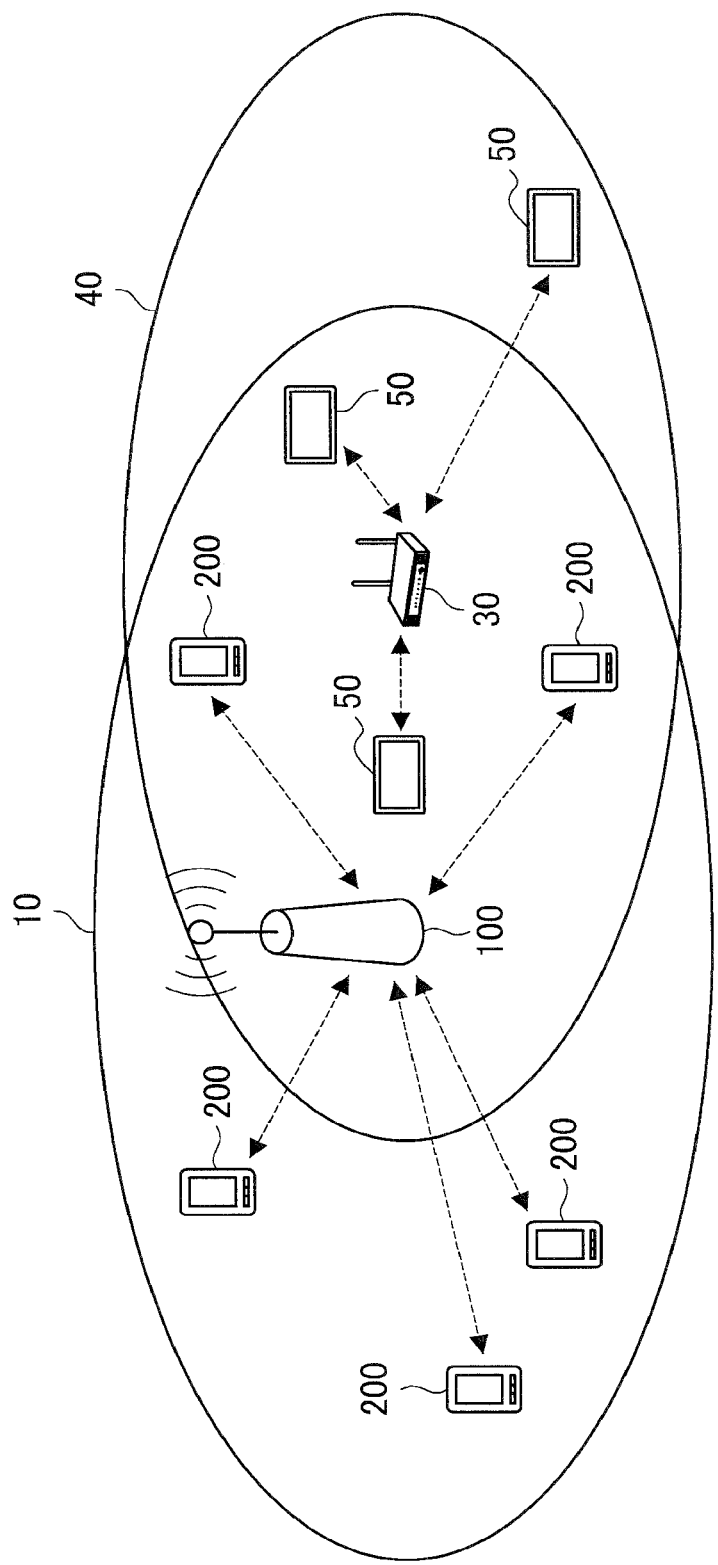
FIG. 4 is an explanatory diagram illustrating an example of a communication area of a wireless local area network (LAN) overlapping a small cell.

FIG. 4 is an explanatory diagram illustrating an example of a communication area of a wireless LAN overlapping a small cell. Referring to FIG. 4, the base station 100 which is a small base station and the terminal device 200 are illustrated. Further, an access point 30 of a wireless LAN and a terminal device 50 for performing wireless LAN communication are located around the base station 100 and the terminal device 200. A communication area 40 of the access point 30 overlaps the cell 10 which is a small cell.

Figure 5:
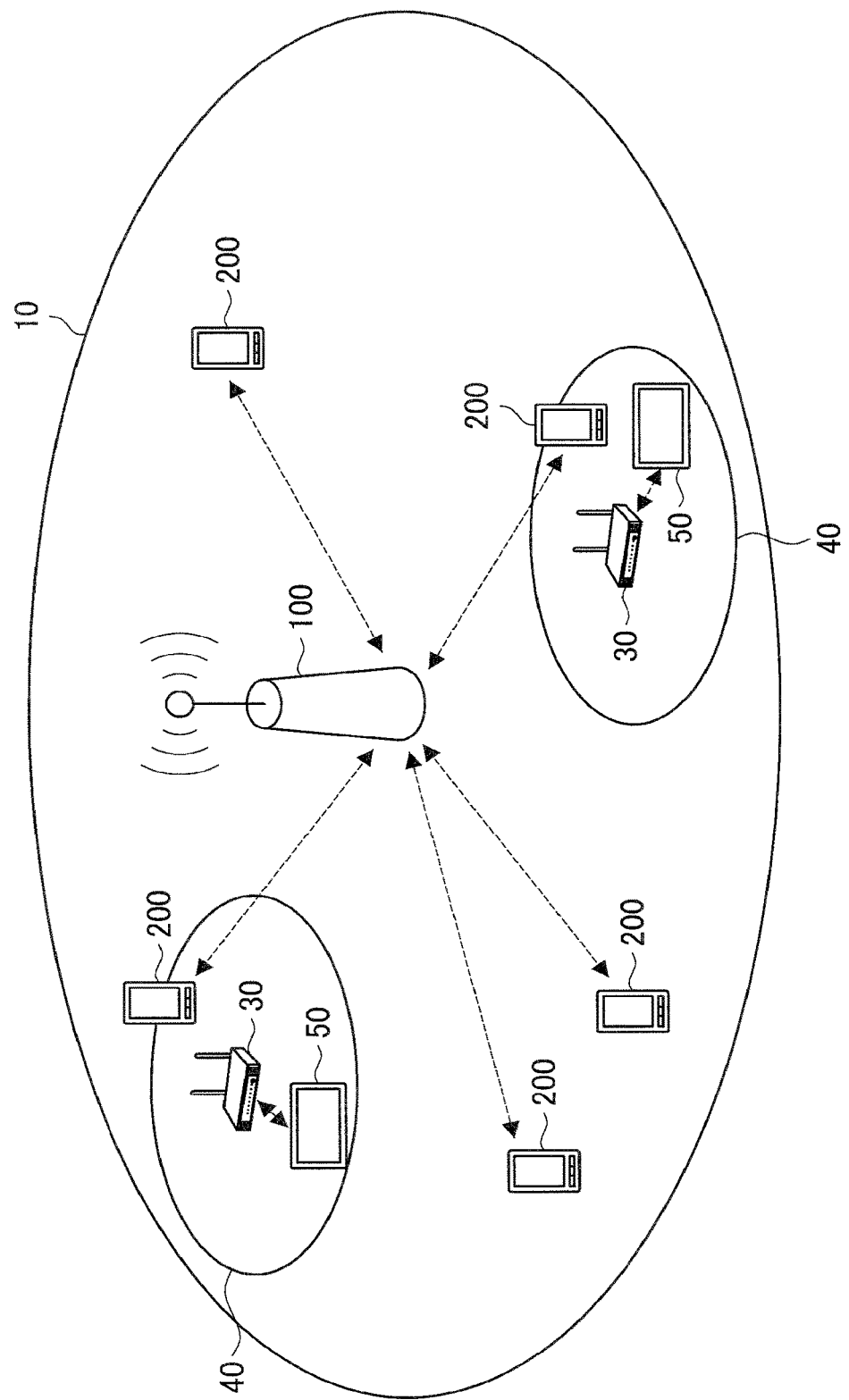
FIG. 5 is an explanatory diagram illustrating an example of a communication area of a wireless LAN overlapping a macro cell.

FIG. 5 is an explanatory diagram illustrating an example of a communication area of a wireless LAN overlapping a macro cell. Referring to FIG. 5, the base station 100 which is a macro base station and the terminal device 200 are illustrated. Further, the access point 30 of a wireless LAN and the terminal device 50 for performing wireless LAN communication are located around the base station 100 and the terminal device 200. The communication area 40 of the access point 30 overlaps the cell 10 which is a macro cell.

Also, the wireless LAN communication (that is, the wireless communication conforming to the wireless LAN standard) can include wireless communication conforming to a wireless LAN standard between terminal devices which perform the wireless LAN communication in addition to wireless communication between the wireless LAN access point and the terminal device (which perform wireless LAN communication). As an example, the wireless LAN communication can also include wireless communication according to Wi-Fi Direct.

The cellular system 1 according to the embodiment of the present disclosure has been described above. Also, the cellular system 1 can include a plurality of base stations 100 as well as one base station 100. Also, the cellular system 1 can include another device in addition to the base station 100 and the terminal device 200. For example, the cellular system 1 can include core network nodes (for example, a mobility management entity (MME), a serving gateway (S-GW), and a packet data network gateway (P-GW), etc.).

<<3. Configuration of Each Device>>

Next, a configuration of each device according to the present embodiment will be described with reference to FIGS. 6 to 14.

<3.1. Configuration of Base Station>

Figure 6:
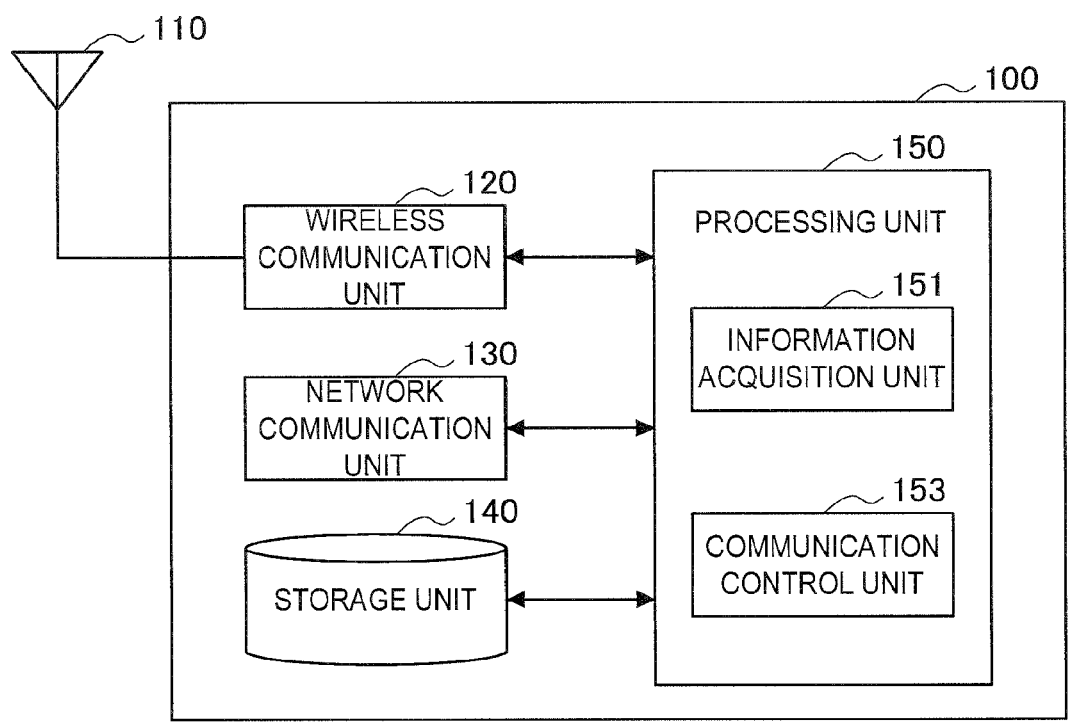
FIG. 6 is a block diagram illustrating an example of a configuration of a base station according to the embodiment.

Next, an example of the configuration of a base station 100-1 according to the first embodiment will be described with reference to FIGS. 6 to 10. FIG. 6 is a block diagram illustrating an example of the configuration of the base station 100-1 according to the first embodiment. Referring to FIG. 6, the base station 100-1 is equipped with an antenna unit 110, a wireless communication unit 120, a network communication unit 130, a storage unit 140, and a processing unit 150.

(Antenna Unit 110)

The antenna unit 110 emits a signal output by the wireless communication unit 120 into space as a radio wave. Additionally, the antenna unit 110 converts a radio wave from space into a signal, and outputs the signal to the wireless communication unit 120.

(Wireless Communication Unit 120)

The wireless communication unit 120 transmits and receives signals. For example, the wireless communication unit 120 transmits a downlink signal to a terminal device 200 positioned within the cell 10, and receives an uplink signal from the terminal device 200 positioned within the cell 10.

For example, the wireless communication unit 120 transmits and receives a signal using the frequency band of the cellular system 1 (that is, a cellular band). Also, particularly, in the embodiment of the present disclosure, the wireless communication unit 120 transmits and receives a signal using the frequency band shared between the cellular communication and the other wireless communication (for example, wireless LAN communication) (that is, a shared band).

(Network Communication Unit 130)

The network communication unit 130 communicates with other nodes. For example, the network communication unit 130 communicates with core network nodes (for example, MME, S-GA, P-GW, etc.). Also, the network communication unit 130 communicates with another base station 100.

(Storage Unit 140)

The storage unit 140 temporarily or permanently stores programs and data for the operation of the base station 100.

(Processing Unit 150)

The processing unit 150 provides various functions of the base station 100. The processing unit 150 includes an information acquisition unit 151 and a communication control unit 153. Also, the processing unit 150 can further include another constituent element other than these constituent elements.

(Information Acquisition Unit 151)

The information acquisition unit 151 acquires information indicating the terminal device 200 which is a device candidate for performing cellular communication (hereinafter, "device candidate information") using a frequency band shared between the cellular communication and the wireless LAN communication (that is, a shared band).

For example, the processing unit 150 (for example, the information acquisition unit 151, the communication control unit 153, or another constituent element) determines a device candidate for performing cellular communication using the above-mentioned shared band from among a plurality of terminal devices 200 communicable with the base station 100. Information indicating the terminal device 200 which is the device candidate (that is, device candidate information) is stored in the storage unit 140. Thereafter, the information acquisition unit 151 acquires the above-mentioned device candidate information at any timing.

As an example, the above-mentioned device candidate information is a list including identification information of each terminal device 200 which is the above-mentioned device candidate.

(Communication Control Unit 153)

(a) Notification of Device Candidate

The communication control unit 153 notifies the terminal device 200 that the terminal device 200 is the above-mention device candidate.

Timing of Notification

For example, the communication control unit 153 notifies the terminal device 200 that the terminal device 200 is the above-mentioned device candidate before the above-mentioned shared band is used in the cellular communication. Thereby, for example, the communication control unit 153 can cause the terminal device 200 which is the above-mentioned candidate to perform a preparatory operation for using the above-mentioned shared band in cellular communication.

Frequency Band to be Used

For example, the communication control unit 153 notifies the terminal device 200 that the terminal device 200 is the above-mentioned device candidate using the cellular band.

Specifically, for example, the communication control unit 153 notifies the above-mentioned terminal device 200 that the above-mentioned terminal device 200 is the above-mentioned device candidate using a cellular band to be used in cellular communication by the base station 100 and the terminal device 200 (for example, a CC).

Technique of Notification

For example, the communication control unit 153 notifies the terminal device 200 which is the above-mentioned device candidate that the terminal device 200 is the above-mentioned device candidate on the basis of device candidate information acquired by the information acquisition unit 151. More specifically, for example, the communication control unit 153 notifies the terminal device 200 for which identification information is included in the above-mentioned device candidate information that the terminal device 200 is the above-mentioned device candidate.

First Example Notification in System Information Block (SIB)

As an example, the communication control unit 153 notifies the terminal device that the terminal device 200 is the above-mentioned device candidate in the SIB.

For example, the above-mentioned SIB includes the above-mentioned device candidate information. As described above, as an example, the device candidate information is a list including identification information of each terminal device 200 which is the above-mentioned device candidate. Through control by the communication control unit 153, the base station 100 transmits the SIB including the above-described device candidate information. For example, the communication control unit 153 generates the above-mentioned SIB. Also, for example, the communication control unit 153 allocates radio resources including the above-mentioned device candidate information to the above-mentioned SIB.

Thereby, for example, a notification of a large number of terminal devices 200 by less radio resources is possible.

Second Example Notification by Signaling

As another example, the communication control unit 153 may notify the terminal device 200 that the terminal device 200 is the above-mentioned device candidate by individual signaling for the terminal device 200.

For example, the above-mentioned individual signaling may be radio resource control (RRC) signaling. Through control by the communication control unit 153, the base station 100 may transmit a message indicating that the terminal device 200 is the above-described device candidate by the RRC signaling for the terminal device 200 which is the above-mentioned device candidate. For example, the communication control unit 153 may generate the message. Also, for example, the communication control unit 153 may allocate radio resources to the message.

Thereby, for example, a fast notification of the terminal device 200 which is the above-mentioned device candidate is possible.

As mentioned above, the communication control unit 153 notifies the terminal device 200 that the terminal device 200 is the above-mentioned device candidate. Thereby, for example, the above-mentioned shared band can be more appropriately used in the cellular system 1. Specifically, for example, it is possible to cause the terminal device 200 which is the above-mentioned device candidate to perform an operation for using the above-mentioned shared band in cellular communication. Also, because it is unnecessary for a terminal device 200 which is not the above-described device candidate to perform any special operation, it is possible to suppress an increase in the number of operations of the terminal device 200 which is not the above-described device candidate.

(b) Determination of Use of Shared Band

For example, the communication control unit 153 determines whether to use the above-mentioned shared band in the cellular communication before the base station 100 uses the above-mentioned shared band in the cellular communication.

For example, the communication control unit 153 determines whether to use the above-mentioned shared band in the cellular communication on the basis of a result of carrier sensing for the above-mentioned shared band by the terminal device 200 which is the above-mentioned device candidate.

Specifically, for example, one or more terminal devices 200 which are the above-mentioned device candidates perform carrier sensing for the above-mentioned shared band and provide results of the carrier sensing to the base station 100. The communication control unit 153 determines whether to use the above-mentioned shared band in cellular communication on the basis of the results of the above-mentioned carrier sensing by the above-mentioned one or more terminal devices 200. As an example, the communication control unit 153 determines to use the above-mentioned shared band in the cellular communication when results of carrier sensing of a predetermined number of terminal devices 200 or terminal devices 200 of a predetermined ratio among the above-mentioned one or more terminal devices 200 indicate that no signal is transmitted using the above-mentioned shared band. As another example, when all the results of the carrier sensing of the above-mentioned one or more terminal devices 200 indicate that no signal is transmitted using the above-mentioned shared band, the communication control unit 153 may determine to use the above-mentioned shared band in the cellular communication.

Thereby, for example, when the above-mentioned shared band for the cellular communication is used, a usage state of the above-mentioned shared band in the periphery of the terminal device 200 is considered. Thus, the occurrence of interference between cellular communication by the terminal device 200 and wireless LAN communication is suppressed.

(c) Transmission of Frame

For example, the communication control unit 153 controls the transmission of the frame by the base station 100 so that the frame including duration information for setting an NAV is transmitted using the above-mentioned shared band before the above-mentioned shared band is used in the cellular communication.

Thereby, for example, it is possible to cause the terminal device for performing wireless LAN communication (hereinafter, referred to as a "wireless LAN device") in which the above-mentioned frame is received to set the above-mentioned NAV. That is, it is possible to cause the wireless LAN device positioned in the periphery of the base station 100 to set the above-mentioned NAV. Consequently, when the cellular communication is performed using the above-mentioned shared band, the use of the above-mentioned shared band by the wireless LAN device positioned in the periphery of the base station 100 can be prevented.

Frame

For example, the above-mentioned frame has a duration field and includes the above-mentioned duration information in the duration field.

As an example, the above-mentioned frame is an RTS frame. As another example, the above-mentioned frame may be a CTS frame. As still another example, the above-mentioned frame may be another type of frame similar to the RTS frame and the CTS frame.

Duration Information

As described above, the above-mentioned duration information is information for setting the NAV. For example, the above-mentioned duration information indicates the duration. Also, the duration is a period after the transmission of the above-mentioned frame and covers a period in which the cellular communication is performed using the above-mentioned shared band. For example, the duration is determined by the communication control unit 153.

According to the transmission of the frame including such duration information, for example, it is possible to cause the wireless LAN device (that is, the wireless LAN device positioned in the periphery of the base station 100) for receiving the frame to set the NAV for covering a period in which the cellular communication is performed using the above-mentioned shared band. Consequently, the use of the above-mentioned shared band by the wireless LAN device positioned in the periphery of the base station 100 can be prevented during the period in which the cellular communication is performed using the above-mentioned shared band.

Also, the duration indicated by the above-mentioned duration information may cover a part of the period in which the cellular communication is performed using the above-mentioned shared band. An additional frame including the duration information for setting the NAV may be transmitted through control by the communication control unit 153 at any timing after the transmission of the above-described frame. Also, another additional frame may be transmitted at any timing after the transmission of the additional frame. One or more additional frames may be transmitted at different timings as described above through control by the communication control unit 153. Every time an additional frame is transmitted, the wireless LAN device can receive the additional frame and update the NAV on the basis of duration information included in the additional frame. As a result, the above-mentioned time in which the cellular communication is performed using the above-mentioned shared band can be covered according to the duration information included in the above-mentioned frame and the above-mentioned one or more additional frames. Also, according to this technique, for example, it is possible to further lengthen a period in which the above-mentioned shared band is used in the cellular communication.

Timing of Transmission

The above-mentioned frame is transmitted, for example, at a timing at which a period in which no signal is transmitted using the above-mentioned shared band becomes a sum of a DIFS and a backoff time. For example, the communication control unit 153 controls the above-mentioned frame to start to be transmitted as described above.

Also, the above-mentioned frame may start to be transmitted before the period in which no signal is transmitted using the above-mentioned shared band becomes the DIFS. Thereby, for example, it is possible to more reliably transmit the above-mentioned frame using the above-mentioned shared band. Further, the above-mentioned frame may start to be transmitted after the period in which no signal is transmitted using the above-mentioned shared band is longer than the SIFS (and before the period becomes the DIFS). Thereby, for example, a collision of a signal of the above-mentioned frame with a signal of wireless LAN communication can be avoided.

Specific Content of Control

For example, the processing unit 150 (the communication control unit 153 or another constituent element) performs carrier sensing for the above-mentioned shared band. When the period in which no signal is transmitted using the above-mentioned shared band becomes a sum of the DIFD and the backoff time, the communication control unit 153 triggers the transmission of a frame including duration information for setting the NAV. Then, the processing unit 150 (the communication control unit 153 or another constituent element) generates a frame including duration information for setting the NAV. Also, for example, the processing unit 150 (the communication control unit 153 or another constituent element) generates a signal of a physical layer of the above-mentioned frame by scrambling, encoding, interleaving, symbol mapping, modulation, etc. and causes the wireless communication unit 120 to transmit the signal.

(d) Instruction of Transmission of Frame

For example, the communication control unit 153 instructs the terminal device 200 which is the above-described device candidate to transmit a frame including duration information for setting the NAV using the above-mentioned shared band before the above-mentioned shared band is used in the cellular communication.

Thereby, for example, it is possible to cause the terminal device 200 which is the above-mentioned device candidate to transmit the above-mentioned frame before the cellular communication is performed using the above-mentioned shared band. As a result, the wireless LAN device for receiving the above-described frame can set the above-mentioned NAV. That is, it is possible to cause the wireless LAN device positioned in the periphery of the terminal device 200 which is the above-mentioned device candidate to set the above-mentioned NAV. Consequently, when the cellular communication is performed using the above-mentioned shared band, the use of the above-mentioned shared band by the wireless LAN device positioned in the periphery of the above-mentioned terminal device 200 can be prevented. That is, a hidden terminal problem can be solved.

Frame

For example, the above-mentioned frame has a duration field and includes the above-mentioned duration information in the duration field.

As an example, the above-mentioned frame is a CTS frame. As another example, the above-mentioned frame may be an RTS frame. As still another example, the above-mentioned frame may be another type of frame similar to the RTS frame and the CTS frame.

Technique of Instruction

First Example Instruction Using Cellular Band

As the first example, the communication control unit 153 uses a cellular band to instruct the above-mentioned terminal device 200 to transmit the above-mentioned frame using the above-mentioned shared band.

For example, using the cellular band used in the cellular communication by the base station 100 and the terminal device 200 (for example, a CC), the communication control unit 153 instructs the above-mentioned terminal device 200 to transmit the above-mentioned frame using the above-mentioned shared band.

As an example, the communication control unit 153 instructs the above-mentioned terminal device 200 to transmit the above-mentioned frame using the above-mentioned shared band by individual signaling for the above-mentioned terminal device 200 which is the above-mentioned device candidate. For example, through control by the communication control unit 153, the base station 100 transmits a frame transmission instruction message for performing an instruction for the transmission of the above-mentioned frame using the above-mentioned shared band by RRC signaling for the terminal device 200 which is the above-mentioned device candidate. For example, the communication control unit 153 generates the message. Also, for example, the communication control unit 153 allocates radio resources to the message.

By performing the instruction using the cellular band, for example, the terminal device 200 can transmit a frame such as a CTS frame without decrypting the RTS frame. That is, a burden on the terminal device 200 can be reduced. Also, by individual signaling for the terminal device 200, for example, a fast notification of the terminal device 200 which is the above-mentioned device candidate is possible.

Also, the communication control unit 153 instructs the above-mentioned terminal device 200 to transmit the above-mentioned frame using the above-mentioned shared band, for example, after the base station 100 transmits a frame including duration information for setting the NAV (for example, an RTS frame).

Also, the communication control unit 153 may instruct the above-mentioned terminal device 200 to transmit the above-mentioned frame using the above-mentioned shared band in an SIB in place of individual signaling.

Provision of Timing Information

For example, the communication control unit 153 provides the above-mentioned terminal device 200 with information which specifies the timing at which the above-mentioned frame is transmitted (hereinafter referred to as "timing information).

Specifically, for example, through control by the communication control unit 153, the base station 100 transmits a frame transmission instruction message including the above-mentioned timing information to the terminal device 200 using the cellular band.

For example, the above-described timing is any timing after the base station 100 transmits a frame including duration information for setting the NAV (for example, an RTS frame).

According to provision of the above-mentioned timing information, for example, the base station 100 can control the timing of frame transmission by the terminal device 200. Also, according to the provision of the above-mentioned timing information, for example, it is possible to cause a plurality of terminal devices 200 to simultaneously transmit frames.

Provision of Duration Information

Also, for example, the communication control unit 153 provides the terminal device 200 with the above-mentioned duration information included in the above-mentioned frame. Alternatively, the communication control unit 153 provides the above-mentioned terminal device 200 with information which specifies the duration information.

Specifically, for example, through control by the communication control unit 153, the base station 100 transmits a fame transmission instruction message including the above-mentioned duration information (or information which specifies the above-mentioned duration information)

included in the above-mentioned frame using the cellular band to the terminal device 200.

For example, the duration indicated by the above-mentioned duration information is a duration from a point in time at which an SIFS has elapsed from an end time-point of transmission of the above-mentioned frame transmitted by the terminal device 200 to a point in time at which the duration indicated by the duration information included in the frame transmitted by the base station 100 ends.

According to provision of the above-mentioned duration information, for example, the base station 100 can control a period in which the wireless LAN device for receiving a frame transmitted by the terminal device 200 avoids transmitting a signal.

Second Example Instruction by Other Frame for Triggering Transmission of Frame

As the second example, the communication control unit 153 may instruct the above-mentioned terminal device 200 to transmit the above-mentioned frame using the above-mentioned shared band by another frame for triggering the transmission of the above-mentioned frame by the above-mentioned terminal device 200.

As described above, for example, the communication control unit 153 controls the transmission of the frame so that a frame including duration information for setting the NAV is transmitted using the above-mentioned shared band (by the base station 100). For example, the frame is the above-mentioned other frame (that is, another frame for triggering the transmission of the above-mentioned frame by the above-described terminal device 200).

For example, the above-mentioned frame has a reception address field and includes a predetermined value in the reception address field. The terminal device 200 which is the above-mentioned device candidate transmits a frame including duration information for setting the NAV using the above-mentioned shared band when the above-mentioned other frame including the above-mentioned predetermined value in the reception address field is received using the above-mentioned shared band. Also, a predetermined value may be included in another field (for example, a transmission address field) in place of the reception address field, and the terminal device 200 may transmit the above-described other frame using the above-mentioned shared band when the frame including the above-mentioned value is received using the above-mentioned shared band.

As an example, the above-mentioned other frame is an RTS frame and triggers the transmission of a CTS frame by the terminal device 200 which is the above-mentioned device candidate.

According to the instruction by the above-mentioned other frame, for example, it is possible to cause the above-mentioned terminal device 200 which is the above-mentioned device candidate to more quickly transmit the above-mentioned frame.

(e) Cellular Communication

For example, the communication control unit 153 controls wireless communication (that is, the cellular communication) of the cellular system 1.

For example, the communication control unit 153 controls wireless communication using the above-mentioned shared band. Also, for example, the communication control unit 153 controls wireless communication using a cellular band.

Example of Cellular Communication Using Shared Band

Hereinafter, an example of cellular communication using the above-mentioned shared band will be described with reference to FIGS. 7 to 13.

First Example

Figure 7:
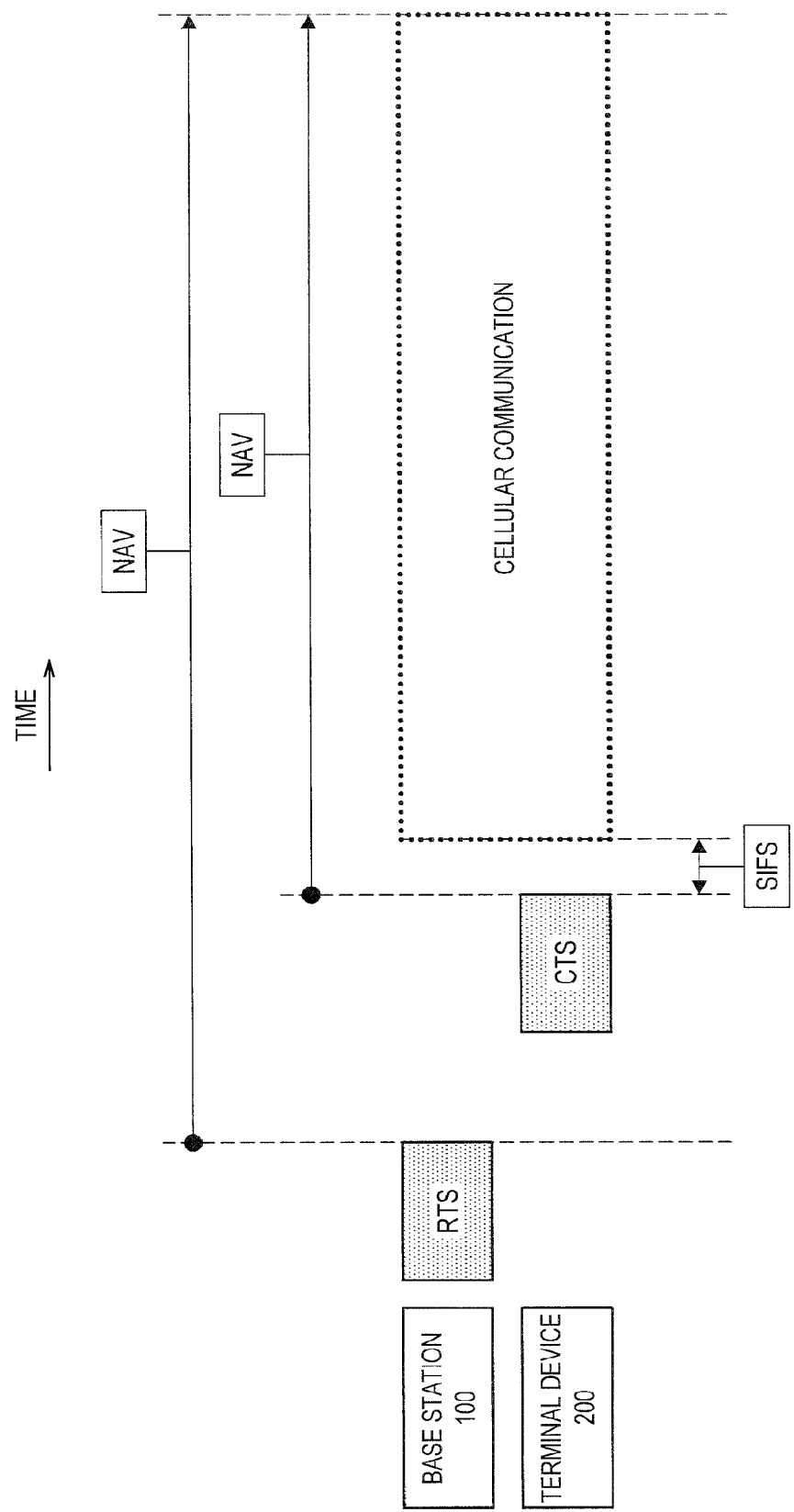
FIG. 7 is a block diagram illustrating a first example of a configuration of cellular communication according to the embodiment.

FIG. 7 is an explanatory diagram illustrating the first example of the cellular communication according to an embodiment of the present disclosure. Referring to FIG. 7, first, the base station 100 transmits an RTS frame using the shared band. Also, the base station 100 transmits a frame transmission instruction message including timing information and duration information to the terminal device 200 using the cellular band. The terminal device 200 transmits a CTS frame including the above-mentioned duration information using the above-mentioned shared band at a timing indicated by the above-mentioned timing information. At a point in time at which an SIFS has elapsed from an end time-point of the transmission (or the reception) of the CTS frame, the base station 100 starts the cellular communication with the terminal device 200 using the above-mentioned shared band. Also, the base station 100 ends the cellular communication before the passage of the period of an NAV set according to the RTS frame (or a period of the NAV set according to the CTS frame).

Second Example

Figure 8:
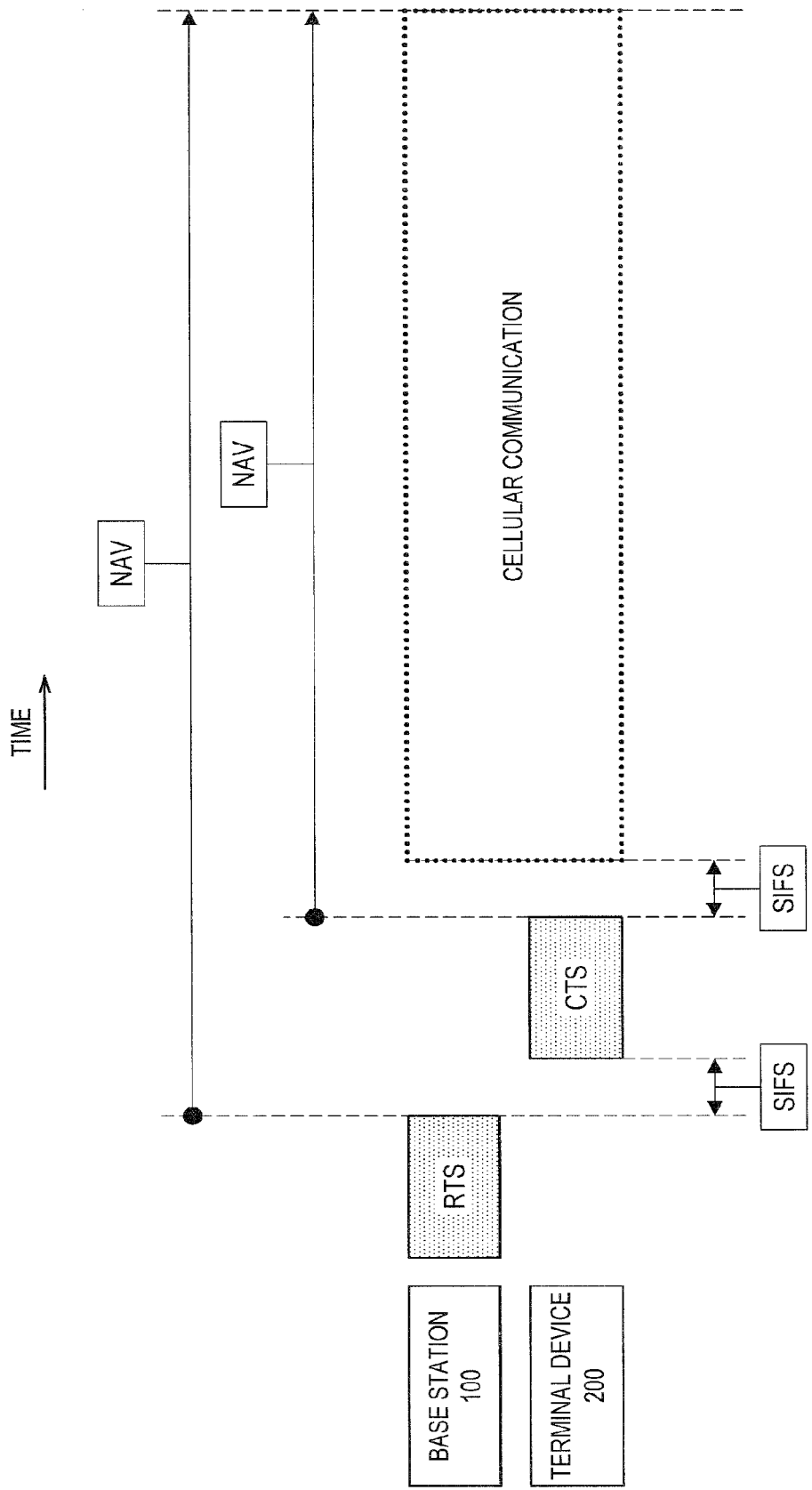
FIG. 8 is a block diagram illustrating a second example of a configuration of cellular communication according to the embodiment.

FIG. 8 is an explanatory diagram illustrating the second example of cellular communication according to an embodiment of the present disclosure. Referring to FIG. 8, first, the base station 100 transmits an RTS frame using a shared band. Then, the terminal device 200 transmits a CTS frame using the above-mentioned shared band according to the reception of the RTS frame. At a point in time at which the SIFS has elapsed from an end time-point of the transmission (or the reception) of the CTS frame, the base station 100 starts cellular communication with the terminal device 200 using the above-mentioned shared band. Also, the base station 100 ends the cellular communication before the passage of the period of an NAV set according to the RTS frame (or the period of the NAV set according to the CTS frame).

Third Example

Figure 9:
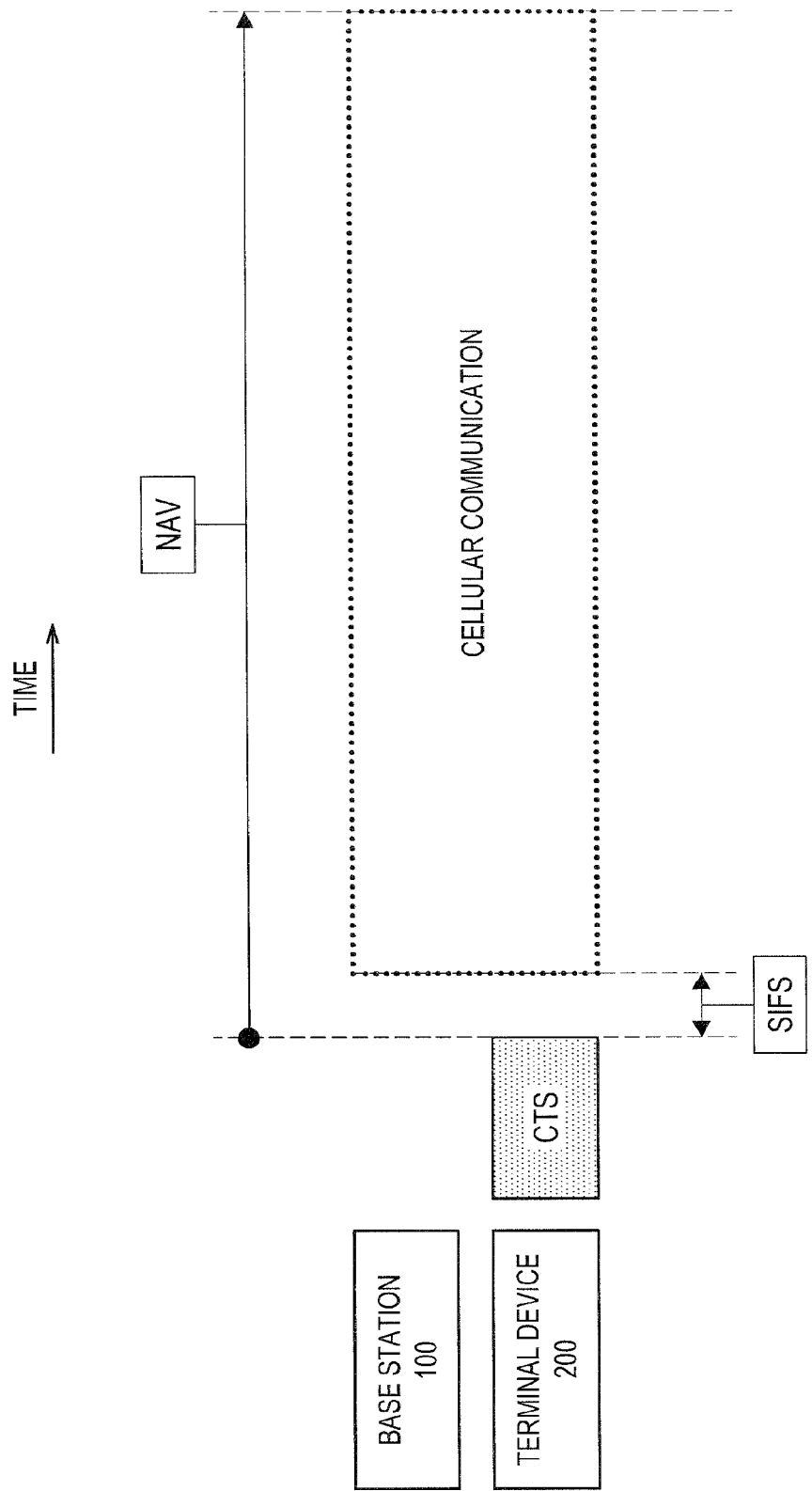
FIG. 9 is a block diagram illustrating a third example of a configuration of cellular communication according to the embodiment.

FIG. 9 is an explanatory diagram illustrating the third example of cellular communication according to an embodiment of the present disclosure. Referring to FIG. 9, the base station 100 transmits a frame transmission instruction message including timing information and duration information to the terminal device 200 using a cellular band, and the terminal device 200 transmits a CTS frame including the above-mentioned duration information using the above-mentioned shared band at a timing indicated by the timing information. At a point in time at which the SIFS has elapsed from the end time-point of the transmission (or the reception) of the CTS frame, the base station 100 starts the cellular communication with the terminal device 200 using the above-mentioned shared band. Also, the base station 100 ends the cellular communication before the passage of the period of an NAV set according to the CTS frame.

Fourth Example

Figure 10:
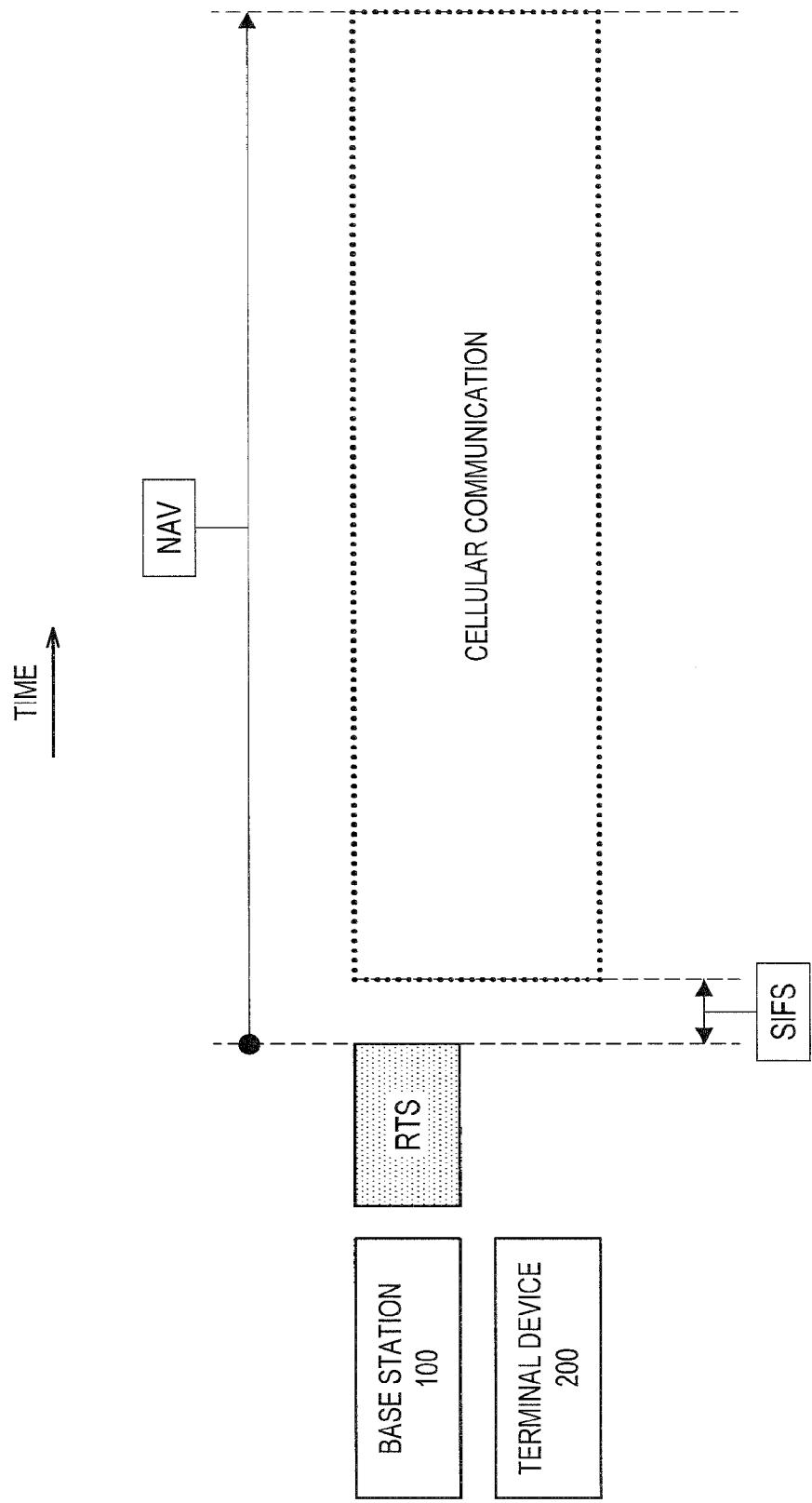
FIG. 10 is a block diagram illustrating a fourth example of a configuration of cellular communication according to the embodiment.

FIG. 10 is an explanatory diagram illustrating the fourth example of cellular communication according to an embodiment of the present disclosure. Referring to FIG. 10, the base station 100 transmits an RTS frame using a shared band. At a point in time at which the SIFS has elapsed from an end time-point of the transmission (or the reception) of the RTS frame, the base station 100 starts cellular communication with the terminal device 200 using the above-mentioned shared band. Also, the base station 100 ends the cellular communication before the passage of the period of an NAV set according to the RTS frame.

Duplex Operation

In the cellular system 1, time division duplex (TDD) or frequency division duplex (FDD) are adopted as the duplex operation. That is, the duplex operation of the cellular system 1 is the TDD or FDD.

TDD

As the first example, the TDD is adopted as the duplex operation in the cellular system 1. That is, the duplex operation of the cellular system 1 is the TDD. In this case, the above-mentioned shared band is used as a band for both downlink and uplink in the cellular system 1. Hereinafter, an example of the cellular communication when the TDD is adopted will be described with reference to FIG. 11.

Figure 11:
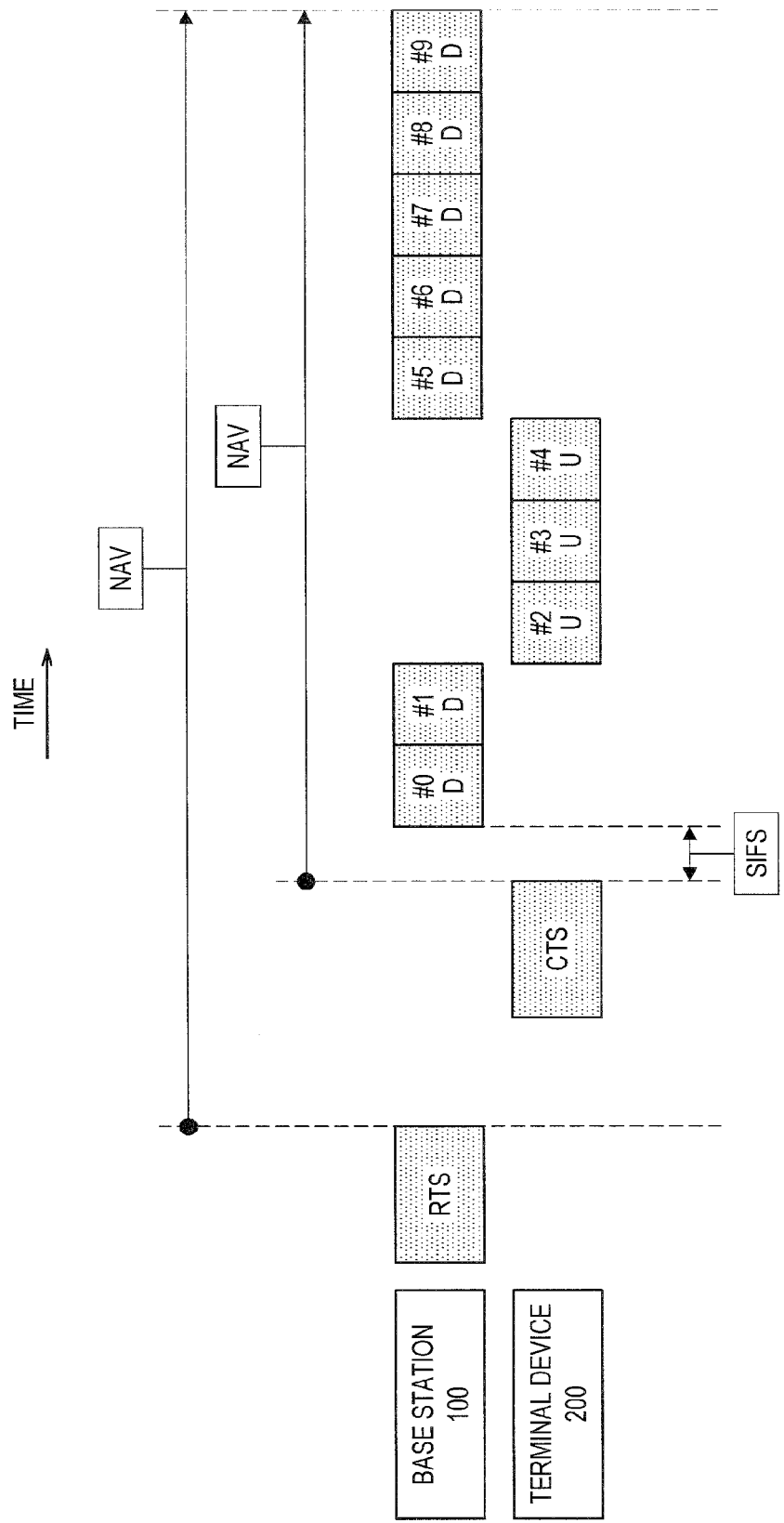
FIG. 11 is an explanatory diagram illustrating an example of cellular communication when time division duplex (TDD) is adopted.

FIG. 11 is an explanatory diagram illustrating an example of cellular communication when the TDD is adopted. Referring to FIG. 11, for example, within a period in which the cellular communication is performed using a shared band, the base station 100 transmits a signal to the terminal device 200 using the shared band in a downlink frame, and the terminal device 200 receives the signal. Also, in an uplink sub-frame within the above-mentioned period, the terminal device 200 transmits a signal to the base station 100 using the above-mentioned shared band, and the base station 100 receives the signal.

Also, cellular communication of only one radio frame is illustrated in the example of FIG. 11, but, of course, cellular communication of two or more frames may be performed. This is applied to FIGS. 12 and 13 which will be described below as well as FIG. 11.

FDD

As the second example, the FDD is adopted as the duplex operation in the cellular system 1. That is, the duplex operation of the cellular system 1 is the FDD.

For example, a partial band included in the above-mentioned shared band in the cellular system 1 is used as a downlink band and another partial band included in the above-mentioned shared band is used as an uplink band. Hereinafter, an example of cellular communication when the FDD is adopted will be described with reference to FIG. 12.

Figure 12:
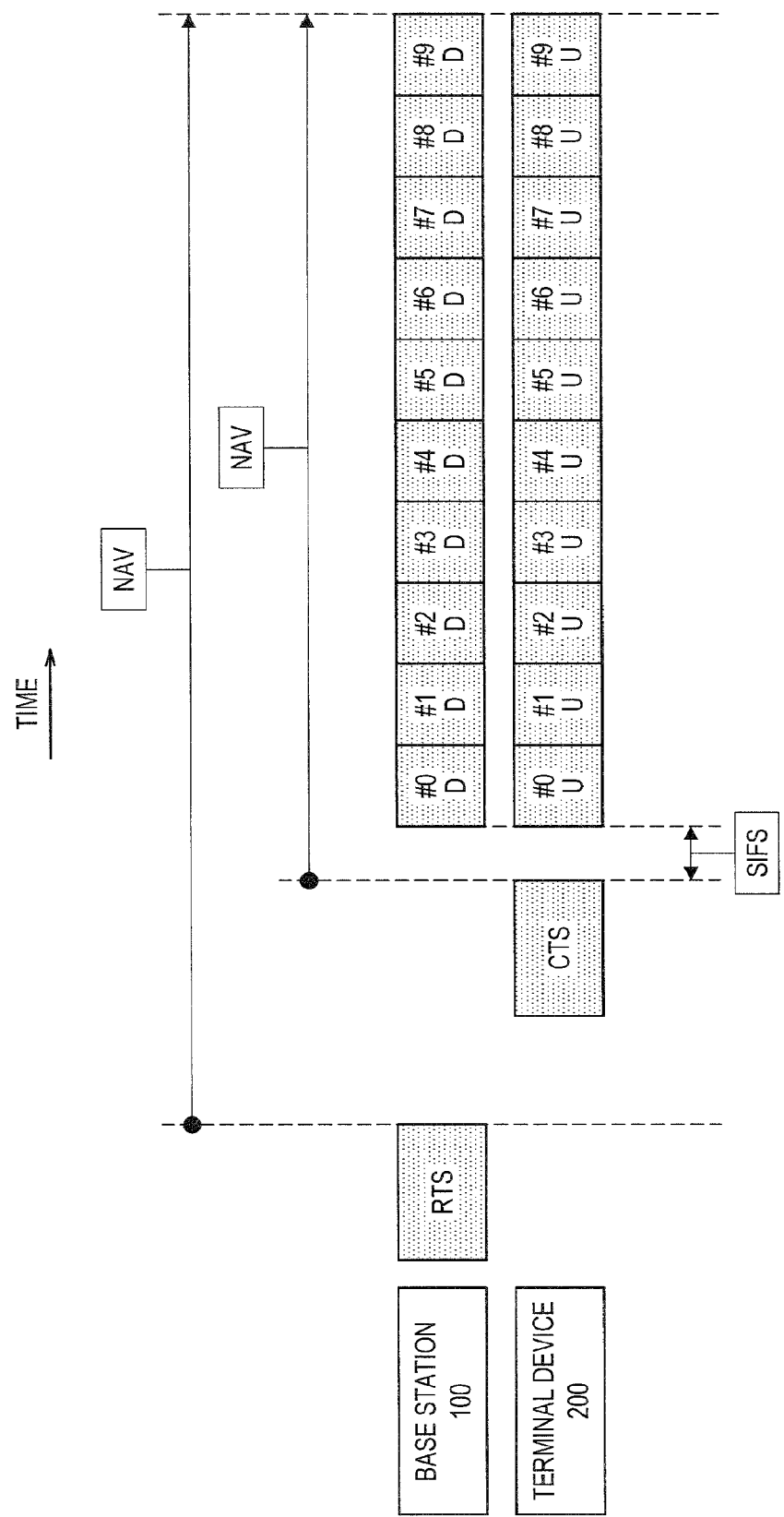
FIG. 12 is an explanatory diagram illustrating an example of cellular communication when frequency division duplex (FDD) is adopted.

FIG. 12 is an explanatory diagram illustrating an example of cellular communication when the FDD is adopted. Referring to FIG. 12, for example, within a period in which the cellular communication is performed using a shared band, the base station 100 transmits a signal to the terminal device 200 using a partial band of the shared band as a downlink band, and the terminal device 200 receives the signal. Also, within the above-mentioned period, the terminal device 200 transmits a signal to the base station 100 using another partial band of the above-mentioned shared band as an uplink band, and the base station 100 receives the signal.

Also, two shared bands may be used in place of using the partial band of the shared band as the downlink band and using the other partial band of the shared band as the uplink band. In this case, in the cellular system 1, one of the two shared bands may be used as the downlink band and the other of the two shared bands may be used as the uplink band.

Also, the shared band may be used as one of the downlink band and the uplink band. For example, the shared band may be used as the downlink band in the cellular system 1. The cellular band may be used as the uplink band corresponding to the above-mentioned shared band. That is, an uplink control signal associated with the shared band may be transmitted to the base station 100 by the terminal device 200 using the cellular band. Hereinafter, in this regard, a specific example will be described with reference to FIG. 13.

Figure 13:
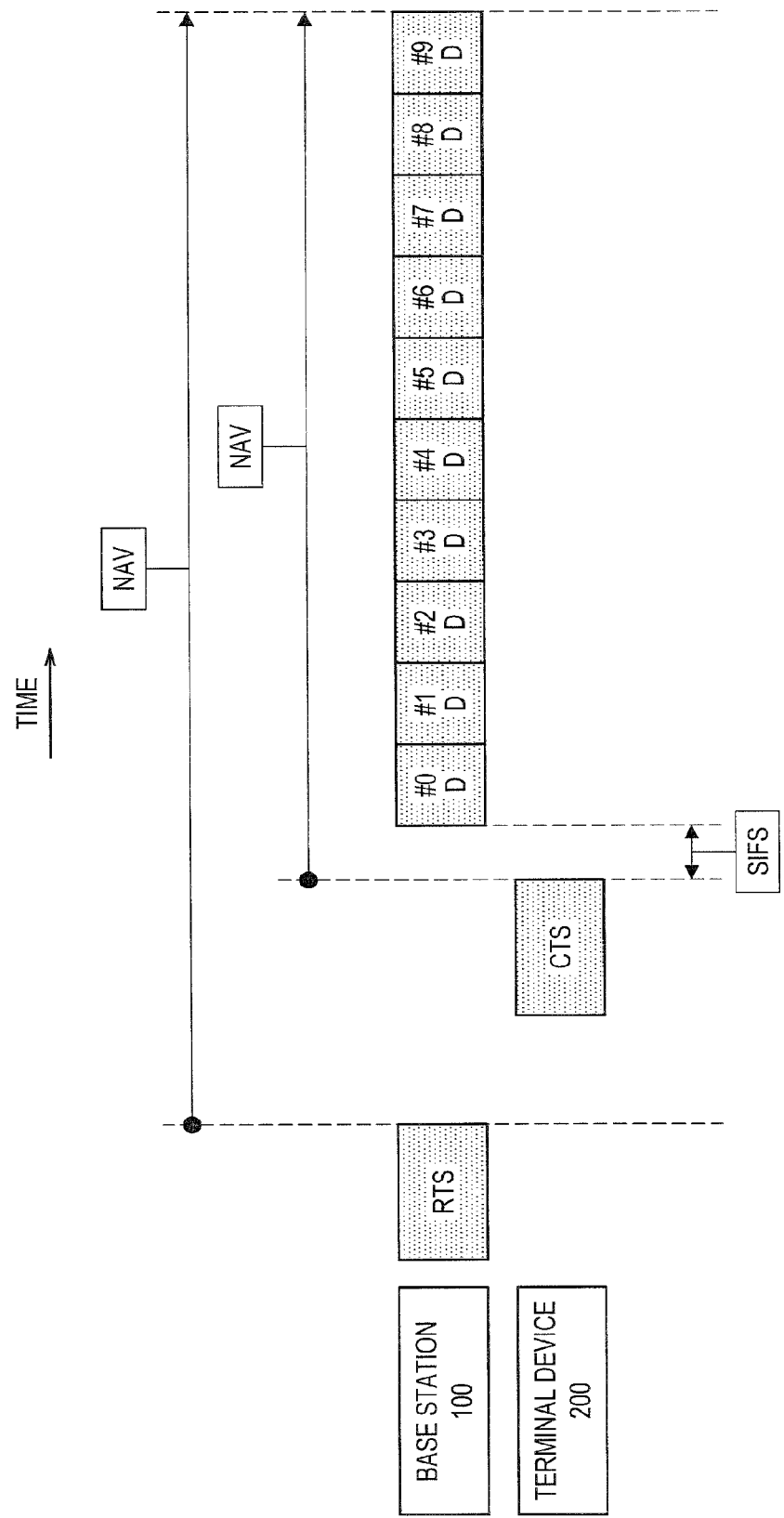
FIG. 13 is an explanatory diagram illustrating another example of cellular communication when FDD is adopted.

FIG. 13 is an explanatory diagram illustrating another example of cellular communication when the FDD is adopted. Referring to FIG. 13, within a period in which the cellular communication is performed using the shared band, the base station 100 may transmit a signal to the terminal device 200 using the shared band as a downlink band, and the terminal device 200 may receive the signal. Also, an uplink control signal associated with the shared band may be transmitted to the base station 100 by the terminal device 200 using the cellular band.

By using the shared band as the downlink band, for example, a hidden terminal problem can be reduced. Specifically, for example, because the terminal device 200 does not transmit an uplink signal using the above-mentioned shared band, the interference to wireless LAN communication of the wireless LAN device positioned in the periphery of the terminal device 200 is suppressed.

<3.2. Configuration of Terminal Device>

Figure 14:
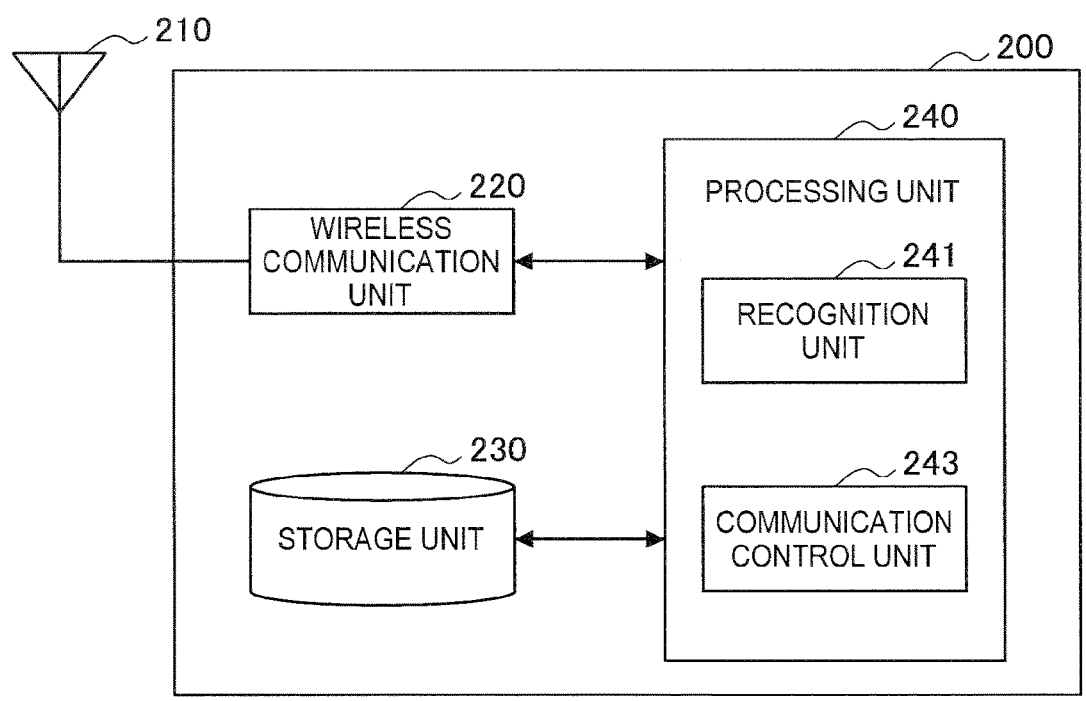
FIG. 14 is a block diagram illustrating an example of a configuration of a terminal device according to the embodiment.

Next, an example of a configuration of the terminal device 200-1 according to an embodiment of the present disclosure will be described with reference to FIG. 14. FIG. 14 is a block diagram illustrating the example of the configuration of the terminal device 200 according to an embodiment of the present disclosure. Referring to FIG. 14, the terminal device 200 includes an antenna unit 210, a wireless communication unit 220, a storage unit 230, and a processing unit 240.

(Antenna Unit 210)

The antenna unit 210 emits a signal output by the wireless communication unit 220 into space as a radio wave. Additionally, the antenna unit 210 converts a radio wave from space into a signal, and outputs the signal to the wireless communication unit 220.

(Wireless Communication Unit 220)

The wireless communication unit 220 transmits and receives a signal. For example, the wireless communication unit 220 receives a downlink signal from the base station 100 and transmits an uplink signal to the base station 100 when the terminal device 200 is located within the cell 10.

For example, the wireless communication unit 220 transmits and receives a signal using a cellular band. Also, particularly, in the embodiment of the present disclosure, the wireless communication unit 220 transmits and receives a signal using a frequency band shared between cellular communication and other wireless communication (for example, wireless LAN communication) (that is, a shared band).

(Storage Unit 230)

The storage unit 230 temporarily or permanently stores programs and data for the operation of the terminal device 200.

(Processing Unit 240)

The processing unit 240 provides various functions of the terminal device 200. The processing unit 240 includes a recognition unit 241 and a communication control unit 243. Also, the processing unit 240 can further include another constituent element other than these constituent elements.

(Recognition Unit 241)

The recognition unit 241 recognizes that the terminal device 200 is a device candidate for performing cellular communication using the shared band shared between the cellular communication and the wireless LAN communication through a notification by the base station 100.

For example, when the terminal device 200 is a device candidate for performing the cellular communication using the above-mentioned shared band, the base station 100 (the communication control unit 153) notifies the terminal device 200 that the terminal device 200 is the above-mentioned device candidate as described above. Thus, the recognition unit 241 recognizes that the terminal device 200 is the above-mentioned device candidate according to the notification by the base station 100.

(Communication Control Unit 243)

The communication control unit 243 performs control for using the above-mentioned shared band in the cellular communication when the terminal device 200 is the above-mentioned device candidate.

(a) Report of Result of Carrier Sensing

For example, the above-mentioned control for using the above-mentioned shared band in the cellular communication includes reporting the result of carrier sensing by the terminal device 200 to the base station 100. That is, the communication control unit 243 reports the result of the carrier sensing by the terminal device 200 to the base station 100 when the terminal device 200 is the above-mentioned device candidate.

Specifically, for example, when the recognition unit 241 recognizes that the terminal device 200 is the above-mentioned device candidate, the processing unit 240 (the communication control unit 243 or another constituent element) performs the carrier sensing for the above-mentioned shared band. That is, the processing unit 240 confirms whether a signal is transmitted using the above-mentioned shared band. The communication control unit 243 reports the result of the above-mentioned carrier sensing to the base station 100 using the cellular band. As an example, the above-mentioned result of the above-mentioned carrier sensing is information indicating whether the signal is transmitted using the above-mentioned shared band.

According to the report of the result of the carrier sensing described above, for example, the base station 100 can know a usage state of the above-mentioned shared band in the periphery of the terminal device 200. Thus, when the above-mentioned shared band for the cellular communication is used, the usage state of the above-mentioned shared band in the periphery of the terminal device 200 is considered. Thus, the occurrence of interference between the cellular communication and the wireless LAN communication by the terminal device 200 can be suppressed.

(b) Transmission of Frame

For example, the above-mentioned control for using the above-mentioned band in the cellular communication includes controlling the transmission of the frame by the terminal device 200 so that the frame including the duration information for setting the NAV is transmitted using the above-mentioned shared band. That is, the communication control unit 243 controls the transmission of the frame by the terminal device 200 so that the frame including the duration information for setting the NAV is transmitted using the above-mentioned shared band.

Frame

For example, the above-mentioned frame has a duration field and includes the above-mentioned duration information in the duration field.

As an example, the above-mentioned frame is a CTS frame. As another example, the above-mentioned frame may be an RTS frame. As still another example, the above-mentioned frame may be another type of frame similar to the RTS frame and the CTS frame.

Transmission According to Instruction by Base Station

For example, the communication control unit 243 controls the transmission of the frame by the terminal device 200 so that the above-mentioned frame is transmitted using the above-mentioned shared band according to the instruction by the base station 100.

First Example Instruction Using Cellular Band

As the first example, using the cellular band, the base station 100 instructs the terminal device 200 to transmit the above-mentioned frame using the above-mentioned shared band. According to this instruction, the communication control unit 243 controls the transmission of the frame by the terminal device 200 so that the above-mentioned frame is transmitted using the above-mentioned shared band.

For example, timing information which specifies a timing at which the above-mentioned frame is transmitted is provided to the terminal device 200 by the base station 100. The communication control unit 243 controls the transmission of the above-mentioned frame by the terminal device 200 so that the above-mentioned frame (for example, the CTS frame) is transmitted at the timing specified from the timing information.

Also, for example, the duration information (or information which specifies the duration information) included in the above-mentioned frame is provided to the terminal device 200 by the base station 100. The communication control unit 243 controls the transmission of the above-mentioned frame by the terminal device 200 so that the frame (for example, the CTS frame) including the above-mentioned duration information provided by the base station 100 is transmitted.

Second Example Instruction by Other Frame for Triggering Transmission of Frame

As the second example, the base station 100 instructs the terminal device 200 to transmit the above-mentioned frame using the above-mentioned shared band by the other frame for triggering the transmission of the above-mentioned frame by the terminal device 200. The communication control unit 243 controls the transmission of the frame by the terminal device 200 so that the above-mentioned frame is transmitted using the above-mentioned shared band according to the reception of the above-mentioned other frame.

For example, the above-mentioned other frame has a reception address field (or another field) and includes a predetermined value in the reception address field (or the other field). Thus, the communication control unit 243 controls the transmission of the frame by the terminal device 200 so that the above-mentioned frame is transmitted using the above-mentioned shared band according to the reception of another frame including the above-mentioned predetermine value in the reception address field (or the other field).

As an example, the above-mentioned other frame is an RTS frame and triggers the transmission of a CTS frame by the above-mentioned terminal device 200. That is, the base station 100 transmits the RTS frame using the above-mentioned shared band and the terminal device 200 transmits CTS using the above-mentioned shared band according to the reception of the RTS frame.

As mentioned above, the above-mentioned frame is transmitted by the terminal device 200. Thereby, for example, the wireless LAN device which receives the above-mentioned frame transmitted by the terminal device 200 can set the above-mentioned NAV. That is, it is possible to cause the wireless LAN device positioned in the periphery of the terminal device 200 which is the above-mentioned device candidate to set the NAV. Consequently, when the cellular communication is performed using the above-mentioned shared band, the use of the above-mentioned shared band by the wireless LAN device positioned in the periphery of the above-mentioned terminal device 200 can be prevented. That is, a hidden terminal problem can be solved.

(c) Cellular Communication

For example, the communication control unit 243 controls the cellular communication by the terminal device 200.

For example, the communication control unit 243 controls the cellular communication by the terminal device 200 using the above-mentioned shared band. Also, for example, the communication control unit 243 controls the cellular communication by the terminal device 200 using the cellular band.

<<4. Flow of Process>>

Next, examples of the process according to the embodiment of the present disclosure will be described with reference to FIGS. 15 to 17.

(First Example)

Figure 15:
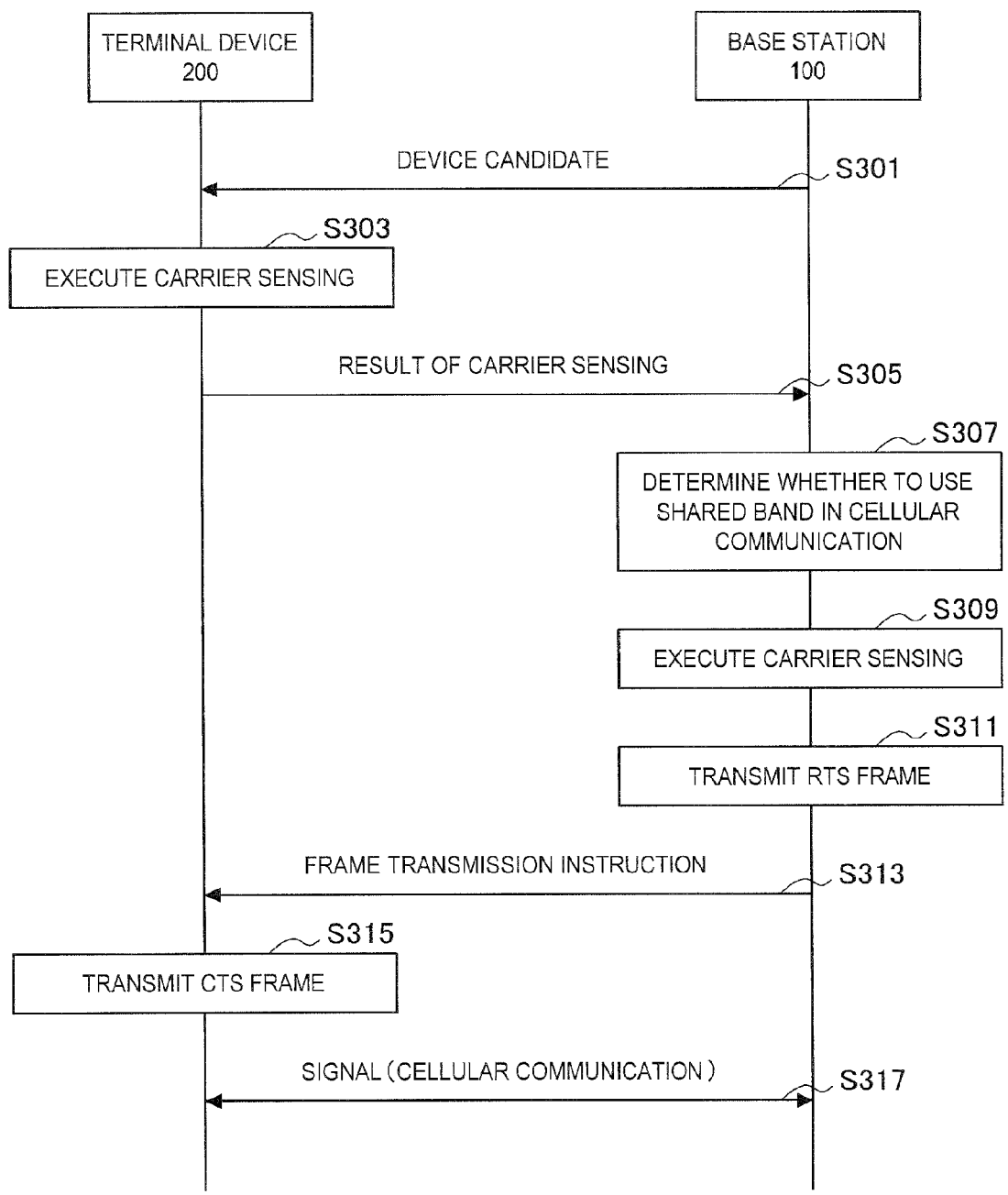
FIG. 15 is a sequence diagram illustrating a first example of a schematic flow of a process according to the embodiment.

FIG. 15 is a sequence diagram illustrating the first example of a schematic flow of the process according to the embodiment of the present disclosure.

The base station 100 acquires device candidate information indicating the terminal device 200 which is the device candidate for performing cellular communication using a shared band and notifies the terminal device 200 that the terminal device 200 is the above-mentioned device candidate using a cellular band (S301).

Thereafter, the terminal device 200 performs carrier sensing for the above-mentioned shared band (S303). The terminal device 200 reports a result of the above-mentioned carrier sensing to the base station 100 using the cellular band (S305).

Further, the base station 100 determines whether to use the above-mentioned shared band in the cellular communication on the basis of the result of the above-mentioned carrier sensing (S307). For example, the base station 100 determines to use the above-mentioned shared band in the cellular communication.

The base station 100 performs the carrier sensing for the above-mentioned shared band (S309) and transmits an RTS frame when a period in which no signal is transmitted using the above-mentioned shared band becomes a sum of a DIFS and a backoff time (S311).

Also, the base station 100 transmits a frame transmission instruction message including timing information and duration information using the cellular band (S313).

Then, the terminal device 200 transmits a CTS frame including the above-mentioned duration information using the above-mentioned shared band at a timing specified from the above-mentioned timing information (S315).

The base station 100 and the terminal device 200 perform the cellular communication using the above-mentioned shared band in a period after the transmission of the CTS frame (S317). That is, the base station 100 and the terminal device 200 transmit signals of the cellular communication in the period.

Also, no frame transmission instruction message is transmitted and the terminal device 200 may transmit the CTS frame using the above-mentioned shared band according to the reception of the RTS frame transmitted using the above-mentioned shared band by the base station 100.

Also, as described above, the base station 100 may transmit another type of frame in place of the RTS frame. Also, the terminal device 200 may transmit another type of frame in place of the CTS frame.

(Second Example)

Figure 16:
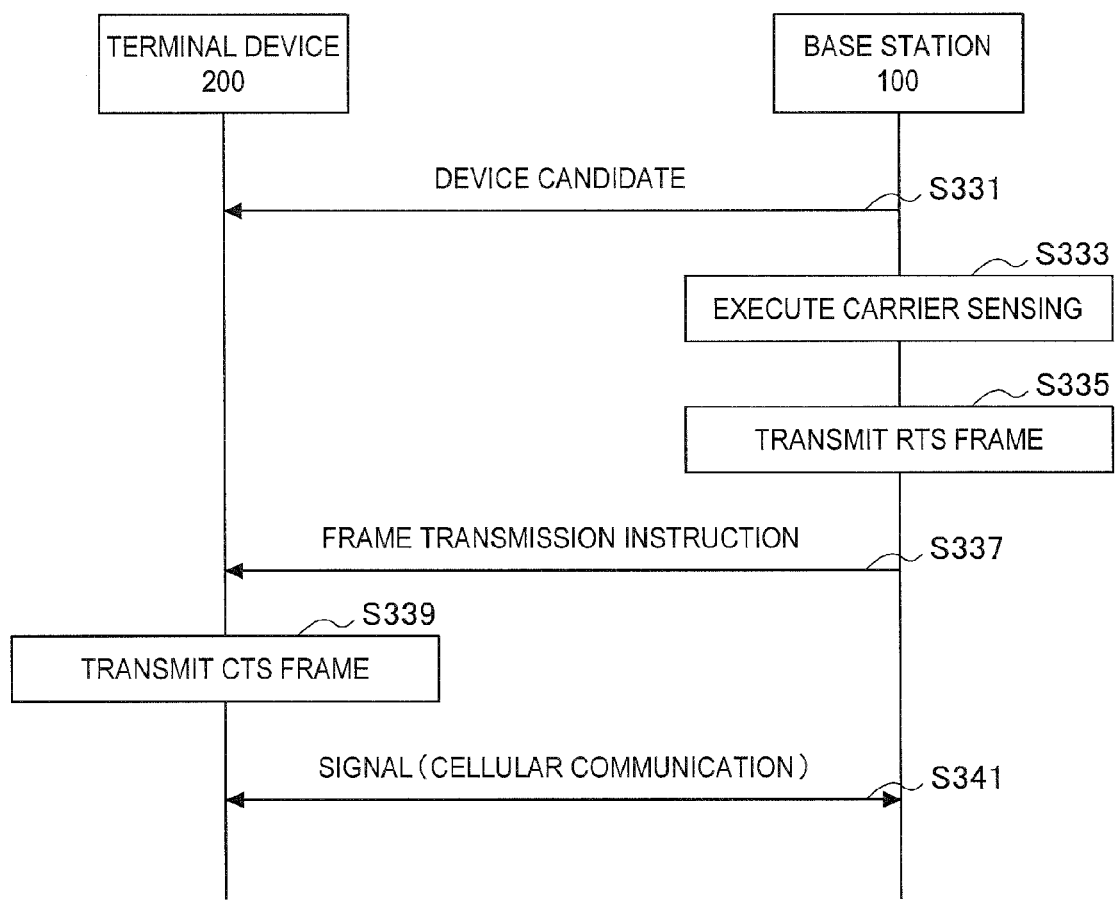
FIG. 16 is a sequence diagram illustrating a second example of a schematic flow of a process according to the embodiment.

FIG. 16 is a sequence diagram illustrating the second example of a schematic flow of the process according to the embodiment of the present disclosure. The second example is an example in which a result of carrier sensing is not reported by the terminal device 200.

Steps S331 to S341 of the above-mentioned second example illustrated in FIG. 16 are the same as steps S301 and S309 to S317 of the above-mentioned first example illustrated in FIG. 15. Consequently, redundant description will be omitted here.

(Third Example)

Figure 17:
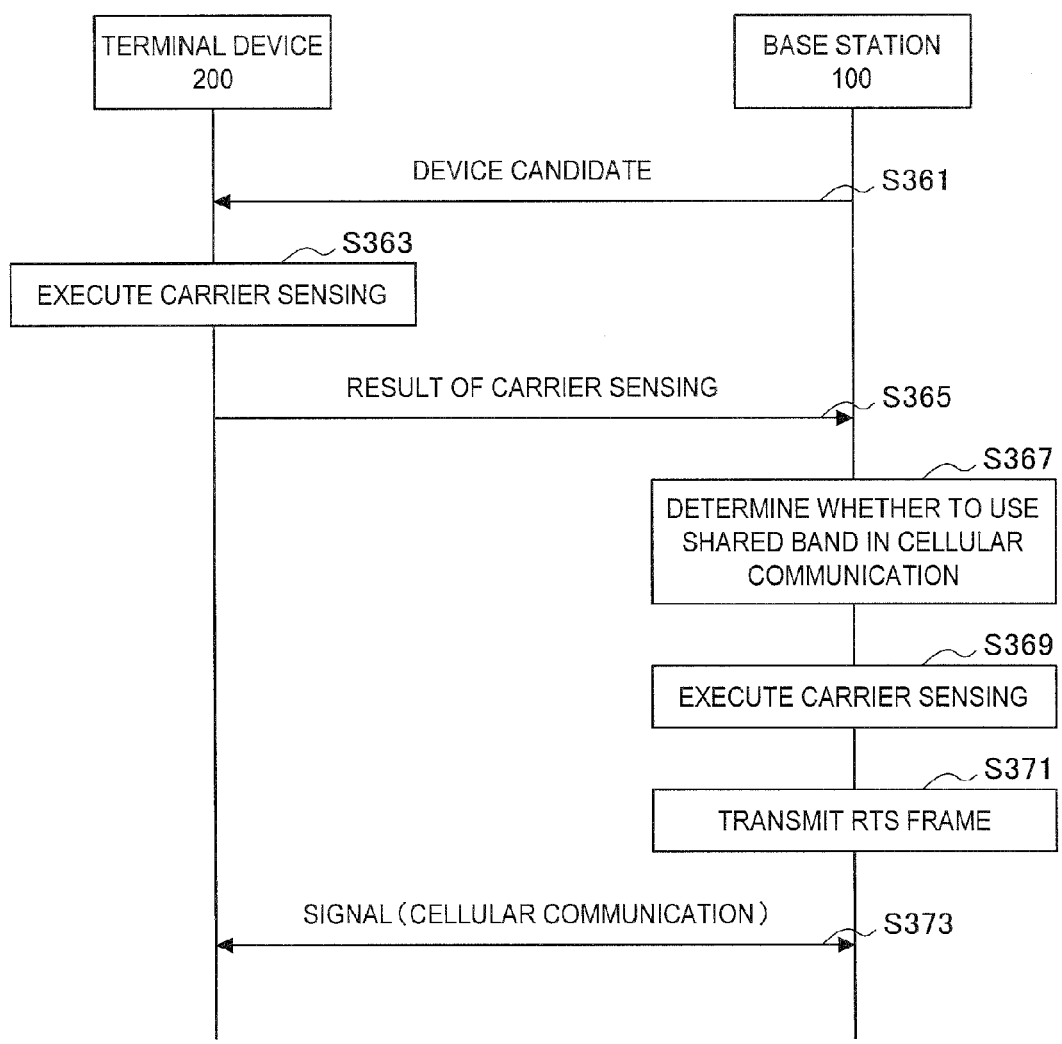
FIG. 17 is a sequence diagram illustrating a third example of a schematic flow of a process according to the embodiment.

FIG. 17 is a sequence diagram illustrating the third example of a schematic flow of the process according to the embodiment of the present disclosure. The third example is an example in which no frame (for example, a CTS frame) is transmitted by the terminal device 200.

Steps S361 to S371 of the above-mentioned third example illustrated in FIG. 17 are the same as steps S301 to S311 of the above-mentioned first example illustrated in FIG. 15. Consequently, redundant description will be omitted here and only step S373 will be described.

The base station 100 and the terminal device 200 perform the above-mentioned cellular communication using the above-mentioned shared band in a period after the transmission of the RTS frame (S373). That is, the base station 100 and the terminal device 200 transmit a signal of the cellular communication in the period.

<<5. First Modified Example>>

Next, the first modified example of the embodiment of the present disclosure will be described with reference to FIGS. 18 and 19.

(Summary)

In the first modified example, the base station 100 synchronizes wireless communication using a shared band with wireless communication using a cellular band. Also, the terminal device 200 achieves the synchronization (achieve) for the above-mentioned shared band on the basis of a result of achieving the synchronization for the cellular band.

Thereby, for example, when the above-mentioned shared band is used in the cellular communication, the terminal device 200 can more quickly start the cellular communication using the above-mentioned shared band.

(Base Station 100: Communication Control Unit 153)

(e) Cellular Communication

In the first modified example, the communication control unit 153 synchronizes the wireless communication using the cellular band with the wireless communication using the above-mentioned shared band.

For example, the communication control unit 153 synchronizes the wireless communication using the cellular band with the wireless communication using the above-mentioned shared band in a time direction. More specifically, for example, the communication control unit 153 synchronizes a radio frame for the cellular band with a radio frame for the above-mentioned shared band.

Also, for example, the same transceiver is used for the above cellular band and the above-mentioned shared band, and the wireless communication of the above-mentioned cellular band and the above-mentioned shared band are synchronized in a frequency direction. Here, the synchronization in the frequency direction means that a deviation in the frequency direction is a predetermined degree (for example, such as 500 Hz) or less.

(Terminal Device 200: Communication Control Unit 243)

(c) Cellular Communication

In the first modified example, the communication control unit 243 achieves the synchronization for the above-mentioned shared band on the basis of a result of achieving the synchronization for the cellular band.

For example, the communication control unit 243 achieves the synchronization for the above-mentioned cellular band. When the above-mentioned shared band is configured to be used in the cellular communication, the communication control unit 243 achieves the synchronization for the above-mentioned shared band on the basis of a result of achieving synchronization for the above-mentioned cellular band. Hereinafter, a specific example will be described with reference to FIG. 18.

Figure 18:
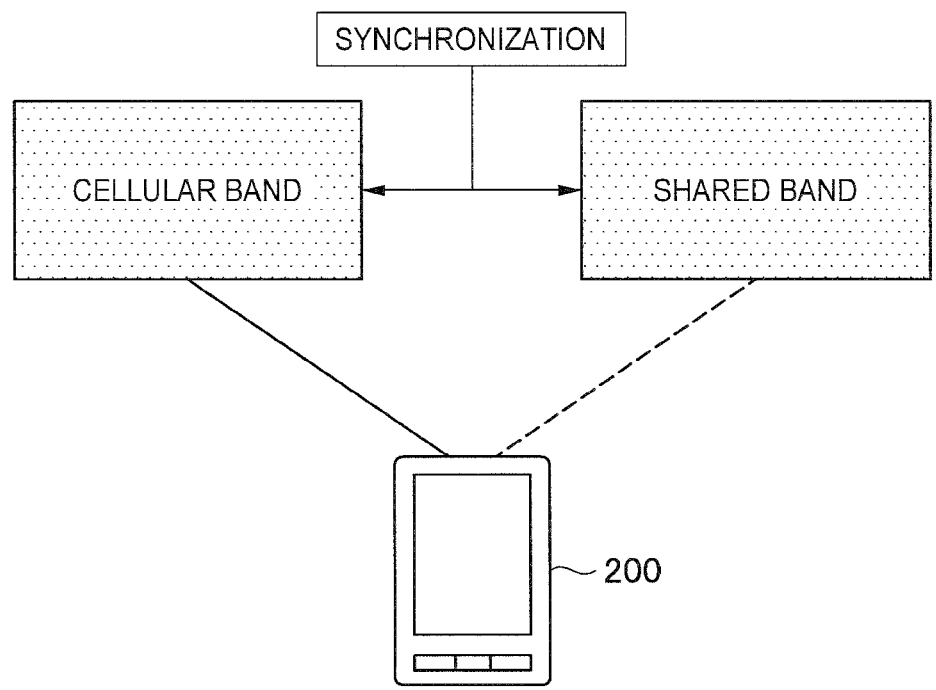
FIG. 18 is an explanatory diagram illustrating an example of acquisition of synchronization for a shared band.

FIG. 18 is an explanatory diagram illustrating the achievement of synchronization for the shared band. Referring to FIG. 18, the cellular band and the shared band are illustrated. The base station 100 synchronizes the wireless communication using the cellular band with the wireless communication using the shared band in the time direction and the frequency direction. First, the communication control unit 243 achieves synchronization in the time direction and the frequency direction for the cellular band before the shared band is used in the cellular communication. Thereafter, when the use of the shared band for the cellular communication starts, the communication control unit 243 achieves the synchronization in the time direction and the frequency direction for the above-mentioned shared band on the basis of the synchronization result in the time direction and the frequency direction for the above-mentioned cellular band. For example, the communication control unit 243 achieves the synchronization in the time direction for the above-mentioned shared band by matching the radio frame for the above-mentioned shared band to the radio frame for the above-mentioned cellular band. Also, for example, the communication control unit 243 achieves the synchronization of the frequency direction for the above-mentioned shared band by correcting deviation in the frequency direction for the above-mentioned shared band as in the correction of the deviation in the frequency direction for the above-mentioned cellular band.

For example, when the above-mentioned shared band is used in the cellular communication according to the achievement of the synchronization for the above-mentioned shared band as described above, the terminal device 200 can more quickly start the cellular communication using the above-mentioned shared band.

More specifically, when the terminal device 200 achieves the synchronization for the above-mentioned shared band, for example, after the above-mentioned shared band starts to be used in the cellular communication, starting the cellular communication (for example, the transmission/reception of data) using the above-mentioned shared band by the terminal device 200 can be delayed. Also, because no synchronization signal for the above-mentioned shared band is transmitted before the above-mentioned shared band is used in the cellular communication, the terminal device 200 cannot acquire the synchronization for the above-mentioned shared band. Therefore, as described above, for example, by achieving the synchronization for the shared band on the basis of a result of achieving the synchronization for the cellular band, the terminal device 200 can more quickly start the cellular communication using the above-mentioned shared band.

(Flow of Process)

Figure 19:
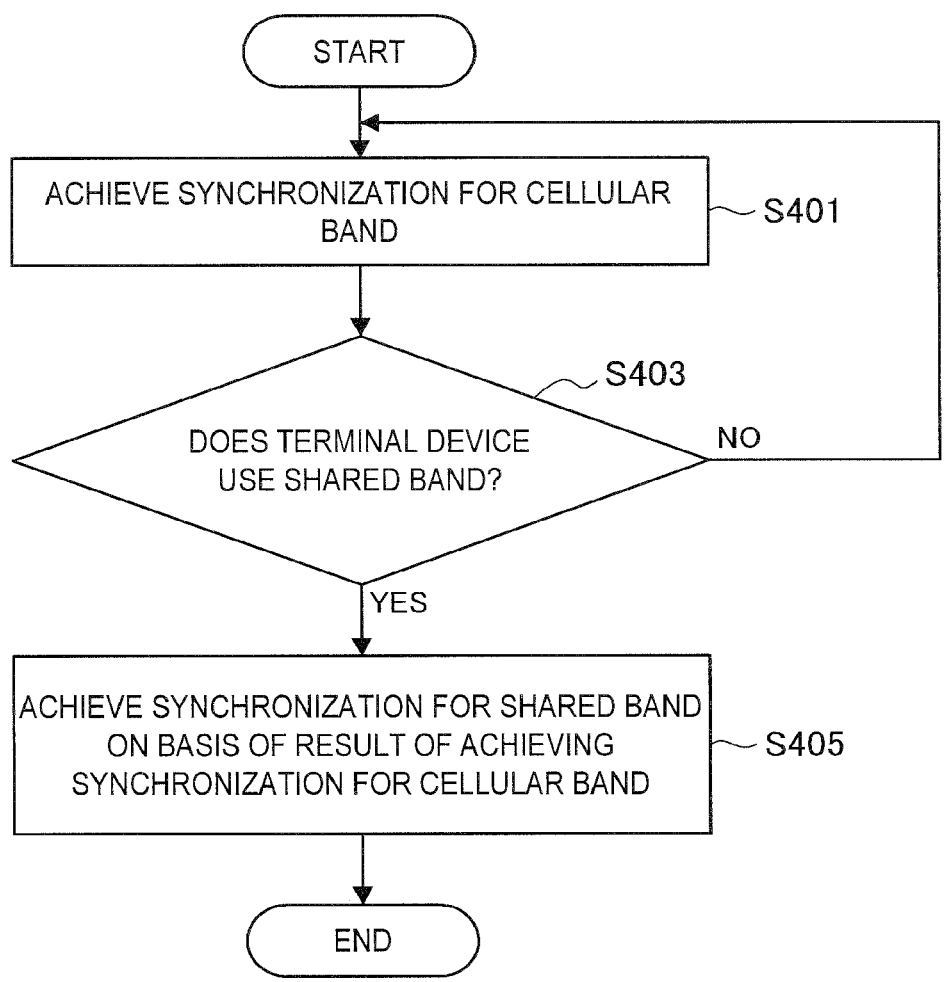
FIG. 19 is a flowchart illustrating an example of a schematic flow of a process according to a first modified example of the embodiment.

FIG. 19 is a flowchart illustrating an example of a schematic flow of the process according to the first modified example of the present embodiment. This process is a process of the terminal device 200.

The communication control unit 243 achieves synchronization for a cellular band (S401).

The communication control unit 243 determines whether the terminal device 200 uses a shared band (S403). When the terminal device 200 does not use the shared band (S403: NO), the process returns to step S401.

When the terminal device 200 uses the shared band (S403: YES), the communication control unit 243 achieves synchronization for the above-mentioned shared band on the basis of a result of achieving the synchronization for the cellular band (S405). The process ends.

<<6. Second Modified Example>>

Next, the first modified example of the embodiment of the present disclosure will be described with reference to FIG. 20.

(Summary)

In the first modified example, the base station 100 notifies one or more terminal devices 200 of a period in which cellular communication is performed using a shared band. The one or more terminal devices 200 are not limited to the device candidate for performing the cellular communication using the above-mentioned shared band. Thereby, for example, the terminal device 200 can perform measurement for the above-mentioned shared band.

Also, the terminal device 200 recognizes the above-mentioned period through a notification by the base station 100 and performs measurement for the above-mentioned shared band in the period. Thereby, for example, the base station 100 can more appropriately determine the device candidate for performing the cellular communication using the above-mentioned shared band.

(Base Station 100: Communication Control Unit 153)

(f) Notification of Period in Which Cellular Communication is Performed Using Shared Band In the second modified example, the communication control unit 153 notifies the one or more terminal devices 200 of the period in which the cellular communication is performed using the above-mentioned shared band. The one or more terminal devices 200 are not limited to the device candidate for performing the cellular communication using the above-mentioned shared band.

Period in Which Cellular Communication is Performed Using Shared Band

For example, the base station 100 transmits a frame (for example, an RTS frame) including duration information for setting an NAV using the above-mentioned shared band after the carrier sensing for the above-mentioned shared band. Then, the period in which the cellular communication is performed using the above-mentioned shared band is determined. The communication control unit 153 notifies the one or more terminal devices 200 of the period.

Timing of Notification

For example, the communication control unit 153 notifies one or more terminal devices 200 of the above-mentioned period after the above-mentioned shared band is available in the cellular communication.

Specifically, for example, the communication control unit 153 notifies the one or more terminal devices 200 of the above-mentioned period after a frame including duration information for setting the NAV is transmitted by the base station 100 and/or the terminal device 200.

Specific Content of Notification

As an example, the communication control unit 153 notifies the one or more terminal devices 200 of the above-mentioned period through the notification of an end time-point of the above-mentioned period. As another example, the communication control unit 153 may notify the one or more terminal devices 200 of the above-mentioned period through a notification of a length of the above-mentioned period.

Technique of Notification

As an example, the communication control unit 153 notifies the one or more terminal devices 200 of the above-mentioned period by individual signaling (for example, RRC signaling) for each of the one or more terminal devices 200. In this case, for example, the communication control unit 153 notifies the one or more terminal devices 200 of the above-mentioned period by the above-mentioned individual signaling using the cellular band used in the cellular communication between the base station 100 and each of the above-mentioned one or more terminal devices 200.

As another example, the communication control unit 153 may notify the one or more terminal devices 200 of the above-mentioned period in an SIB. In this case, for example, the communication control unit 153 may notify the one or more terminal devices 200 of the above-mentioned period in the SIB of each cellular band (for example, each CC). That is, each cellular band (for example, each CC) may be used in the notification of the above-mentioned period.

As described above, the one or more terminal devices 200 are notified of the period in which the cellular communication is performed using the above-mentioned shared band. Thereby, for example, the terminal device 200 can perform measurement for the above-mentioned shared band. More specifically, because a CRS or the like is not transmitted using the above-mentioned shared band, for example, while the above-mentioned shared band is not used in the cellular communication, the terminal device 200 cannot perform the measurement for the above-mentioned shared band. Therefore, for example, the terminal device 200 can perform the measurement for the above-mentioned shared band by notifying the terminal device 200 of the period in which the cellular communication is performed using the above-mentioned shared band.

(g) Determination of Device Candidate

For example, in the second modified example, the communication control unit 153 determines the above-mentioned device candidate (that is, a device candidate for performing the cellular communication using the shared band) on the basis of a result of measurement for the above-mentioned shared band by at least some of the above-mentioned one or more terminal devices.

As described below, when the notification of the period in which the cellular communication is performed using the above-mentioned shared band is provided, the terminal device 200 performs measurement for the above-mentioned shared band in the period and notifies the base station 100 of the result of the measurement for the above-mentioned shared band. The communication control unit 153 determines the above-mentioned device candidate on the basis of the above-mentioned measurement result. As an example, a predetermined number of terminal devices 200 with better communication quality in the above-mentioned shared band are determined as the above-mentioned device candidate.

Thereby, for example, the communication quality of cellular communication using the above-mentioned shared band can be improved.

(Terminal Device 200: Recognition Unit 241)

In the second modified example, the recognition unit 241 recognizes the period in which the cellular communication is performed using the above-mentioned shared band through the notification by the base station 100.

As described above, the base station 100 notifies the terminal device 200 of the period in which the cellular communication is performed using the above-mentioned shared band. Then, the recognition unit 241 recognizes the period.

(Terminal Device 200: Communication Control Unit 243)

(d) Measurement

In the second modified example, the communication control unit 243 performs measurement for the above-mentioned shared band in the period in which the cellular communication is performed using the above-mentioned shared band.

For example, the communication control unit 243 performs measurement for CRS to be transmitted in the above-mentioned shared band in the above-mentioned period. For example, the communication control unit 243 measures reference signal received power (RSRP) and/or reference signal received quality (RSRQ) for the above-mentioned shared band.

Also, the communication control unit 243 reports the result of the measurement for the above-mentioned shared band to the base station 100. That is, the communication control unit 243 reports the measurement of the above-mentioned shared band. As an example, the communication control unit 243 reports the measurement of the above-mentioned shared band regardless of the above-mentioned measurement result. As another example, the communication control unit 243 may perform the measurement report of the above-mentioned shared band when the above-mentioned measurement result satisfies a predetermined condition (for example, a measurement value exceeds a predetermined threshold value).

Thereby, for example, the base station 100 can more appropriately determine the above-mentioned device candidate.

(Flow of Process)

Figure 20:
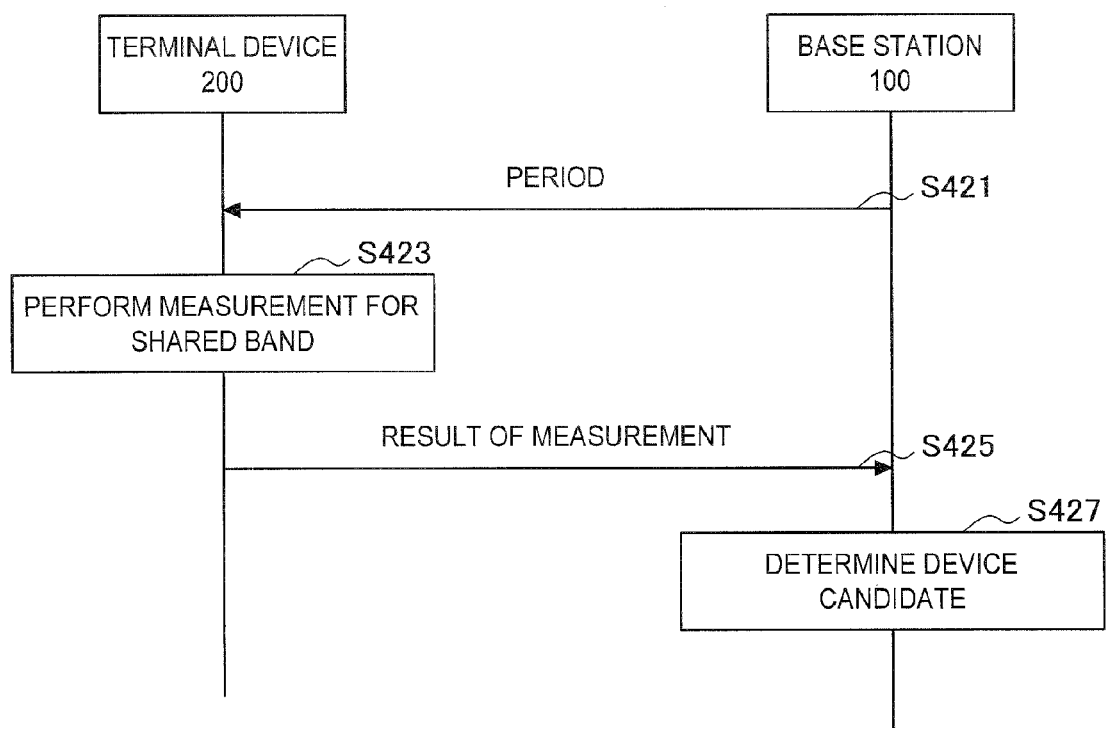
FIG. 20 is a sequence diagram illustrating an example of a schematic flow of a process according to a second modified example of the embodiment.

FIG. 20 is a sequence diagram illustrating an example of a schematic flow of the process according to the second modified example of the present embodiment.

The base station 100 notifies the one or more terminal devices 200 of a period in which a shared band is used in cellular communication (S421).

Then, each of the above-mentioned one or more terminal devices 200 performs measurement for the above-mentioned shared band in the above-mentioned period (S423) and reports a result of the above-mentioned measurement to the base station 100 (S425).

Thereafter, the base station 100 determines a device candidate for performing the cellular communication using the above-mentioned shared band on the basis of the above-mentioned result of the above-mentioned measurement from the above-mentioned one or more terminal devices 200 (S427).

Also, only some of the above-mentioned terminal devices 200 rather than all of the above-mentioned one or more terminal devices 200 may report the above-mentioned measurement result.

<<7. Applications>>

Technology according to the present disclosure is applicable to various products. For example, the base station 100 may be implemented as a type of eNB such as a macro eNB or a small eNB. The small eNB may be an eNB to cover a cell smaller than a macro cell such as a pico eNB, a micro eNB, or a home (femto) eNB. Conversely, the base station 100 may also be realized as another type of base station, such as a NodeB or a base transceiver station (BTS). The base station 100 may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base station 100.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, at least a part of constituent elements of the terminal device 200 may be realized as a module mounted onboard these terminals (for example, an integrated circuit module configured on a single die).

<7.1. Application Examples Regarding Base Station>

(First Application Example)

Figure 21:
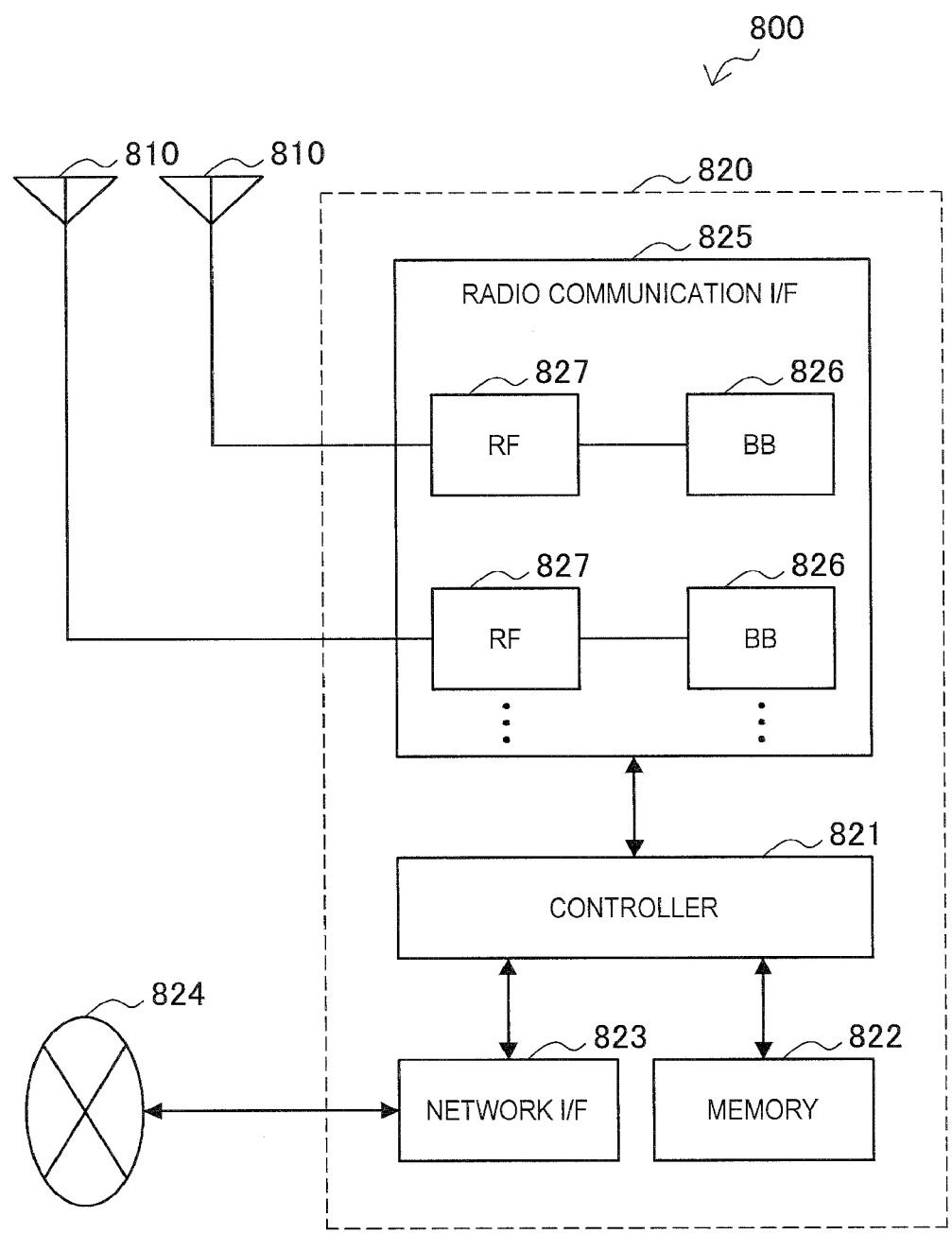
FIG. 21 is a block diagram illustrating a first example of a schematic configuration of an eNB.

FIG. 21 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 21. For example, the multiple antennas 810 may be compatible with multiple frequency bands used by the eNB 800. Although FIG. 21 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 21. For example, the multiple BB processors 826 may be compatible with multiple frequency bands used by the eNB 800. The wireless communication interface 825 may include the multiple RF circuits 827, as illustrated in FIG. 21. For example, the multiple RF circuits 827 may be compatible with multiple antenna elements. Although FIG. 21 illustrates the example in which the wireless communication interface 825 includes the multiple BB processors 826 and the multiple RF circuits 827, the wireless communication interface 825 may also include a single BB processor 826 or a single RF circuit 827.

Furthermore, in addition to a cellular communication scheme, the wireless communication interface 825 may support a radio LAN communication scheme. In that case, the wireless communication interface 825 may include the BB processor 826 and the RF circuit 827 in the radio LAN communication scheme.

In the eNB 800 illustrated in FIG. 21, the information acquisition unit 151 and the communication control unit 153 described with reference to FIG. 6 may be implemented in the wireless communication interface 825 (for example, the BB processor). Alternatively, a part of these structural elements may be implemented in the controller 821. As one example, the eNB 800 is equipped with a module including a part (for example, the BB processor 826) or all of the wireless communication interface 825 and/or the controller 821, and the information acquisition unit 151 and the communication control unit 153 may be implemented in the module. In this case, the above-mentioned module may store a program for causing the processor to function as the information acquisition unit 151 and the communication control unit 153 (in other words, a program for causing the processor to execute the operation of the information acquisition unit 151 and the communication control unit 153) and execute the program. As another example, a program for causing the processor to function as the information acquisition unit 151 and the communication control unit 153 is installed in the eNB 800, and the wireless communication interface 825 (for example, the BB processor 826) and/or the controller 821 may execute the program. As mentioned above, the eNB 800, the base station device 820, or the above-mentioned module may be provided as the device including the information acquisition unit 151 and the communication control unit 153, and the program for causing the processor to function as the information acquisition unit 151 and the communication control unit 153 may be provided. Also, a readable storage medium storing the above-mentioned program may be provided.

Also, in the eNB 800 illustrated in FIG. 21, the wireless communication unit 120 described with reference to FIG. 6 may be implemented in the wireless communication interface 825 (for example, the RF circuit 827). Also, the antenna unit 110 may be implemented in the antenna 810. Also, the network communication unit 130 may be implemented in the controller 821 and/or the network interface 823.

(Second Application Example)

Figure 22:
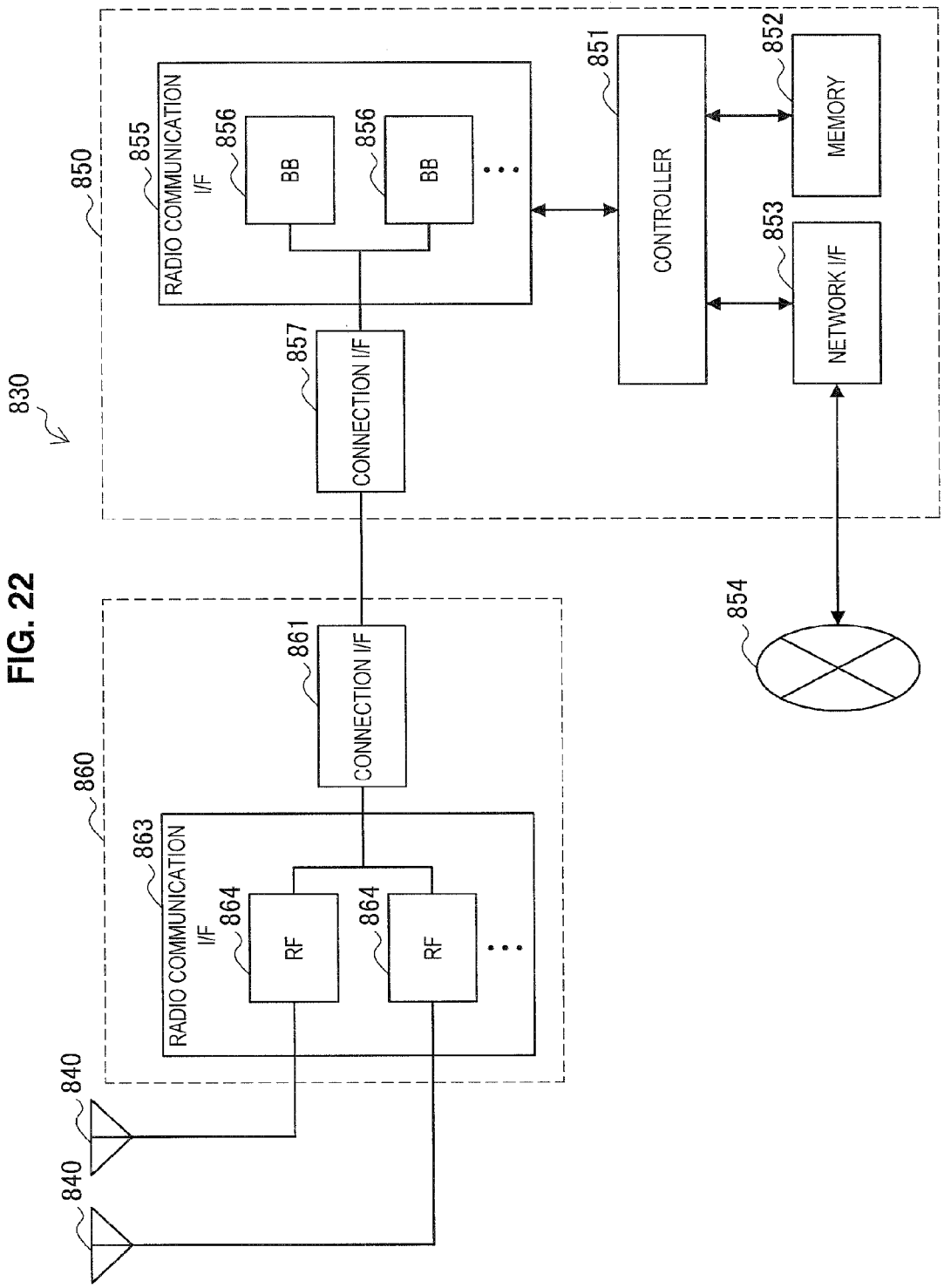
FIG. 22 is a block diagram illustrating a second example of a schematic configuration of an eNB.

FIG. 22 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 22. For example, the multiple antennas 840 may be compatible with multiple frequency bands used by the eNB 830. Although FIG. 22 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 21.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 21, except the BB processor 856 is connected to the RF circuit 864 of the RRH 860 via the connection interface 857. The wireless communication interface 855 may include the multiple BB processors 856, as illustrated in FIG. 22. For example, the multiple BB processors 856 may be compatible with multiple frequency bands used by the eNB 830. Although FIG. 22 illustrates the example in which the wireless communication interface 855 includes the multiple BB processors 856, the wireless communication interface 855 may also include a single BB processor 856.

Furthermore, in addition to a cellular communication scheme, the wireless communication interface 855 may support a radio LAN communication scheme. In that case, the wireless communication interface 825 may include the BB processor 856 in the radio LAN communication scheme.

The connection interface 857 is an interface for connecting the base station device 850 (wireless communication interface 855) to the RRH 860. The connection interface 857 may also be a communication module for communication in the above-mentioned high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 22. For example, the multiple RF circuits 864 may support multiple antenna elements. Although FIG. 22 illustrates the example in which the wireless communication interface 863 includes the multiple RF circuits 864, the wireless communication interface 863 may also include a single RF circuit 864.

In the eNB 830 illustrated in FIG. 22, the information acquisition unit 151 and the communication control unit 153 described with reference to FIG. 6 may be implemented in the wireless communication interface 855 (for example, the BB processor). Alternatively, at least a part of the information acquisition unit 151 and the communication control unit 153 may be implemented in the controller 851. As one example, the eNB 830 is equipped with a module including a part (for example, the BB processor 856) or all of the wireless communication interface 855 and/or the controller 851, and the information acquisition unit 151 and the communication control unit 153 may be implemented in the module. In this case, the above-mentioned module may store a program for causing the processor to function as the information acquisition unit 151 and the communication control unit 153 (in other words, a program for causing the processor to execute the operation of the information acquisition unit 151 and the communication control unit 153) and execute the program. As another example, a program for causing the processor to function as the information acquisition unit 151 and the communication control unit 153 is installed in the eNB 830, and the wireless communication interface 855 (for example, the BB processor 856) and/or the controller 851 may execute the program. As mentioned above, the eNB 830, the base station device 850, or the above-mentioned module may be provided as the device including the information acquisition unit 151 and the communication control unit 153, and the program for causing the processor to function as the information acquisition unit 151 and the communication control unit 153 may be provided. Also, a readable storage medium storing the above-mentioned program may be provided.

Also, in the eNB 830 illustrated in FIG. 22, the wireless communication unit 120 described, for example, with reference to FIG. 6 may be implemented in the wireless communication interface 863 (for example, the RF circuit 864). Also, the antenna unit 110 may be implemented in the antenna 840. Also, the network communication unit 130 may be implemented in the controller 851 and/or the network interface 853.

<7.2. Application Examples Regarding Terminal Device>
(First Application Example)

Figure 23:
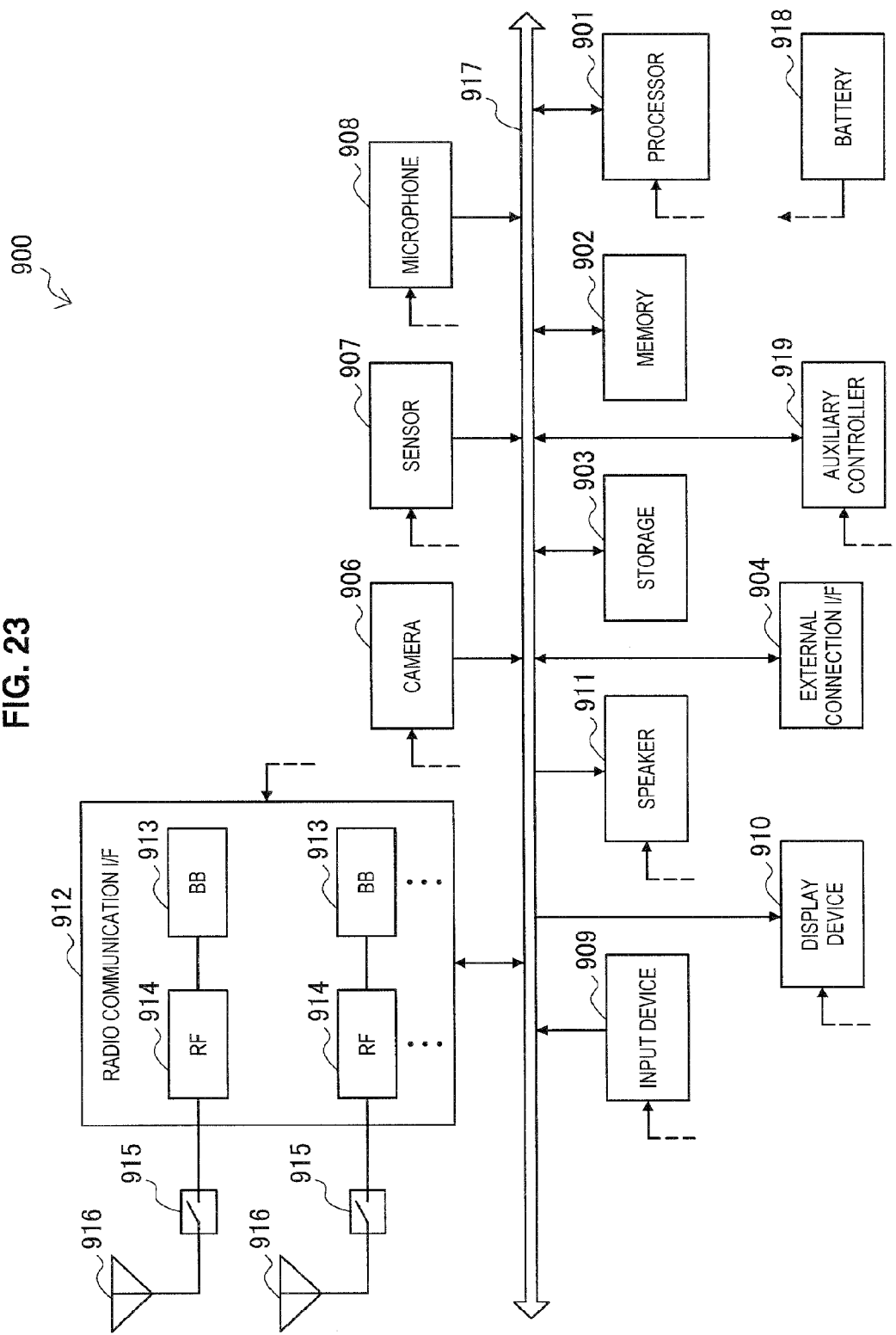
FIG. 23 is a block diagram illustrating an example of a schematic configuration of a smartphone.

FIG. 23 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 934 and the multiple RF circuits 914, as illustrated in FIG. 23. Although FIG. 23 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support a radio LAN communication scheme. In that case, the wireless communication interface 912 may include the BB processor 913 and the RF circuit 914 in the radio LAN communication scheme. Furthermore, in addition to a cellular communication scheme, the wireless communication interface 912 may support another type of wireless communication scheme such as a short-distance wireless communication scheme and a near field communication scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 23. Although FIG. 23 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 33 via feeder lines, which are partially shown as dashed lines in the figure. The auxiliary controller 919 operates a minimum necessary function of the smartphone 900, for example, in a sleep mode.

In the smartphone 900 illustrated in FIG. 23, the recognition unit 241 and the communication control unit 243 described with reference to FIG. 14 may be implemented in the wireless communication interface 912 (for example, the BB processor 913). Alternatively, at least a part of these structural elements may be implemented in the processor 901 or the auxiliary controller 919. As one example, the smartphone 900 is equipped with a module including a part (for example, the BB processor 913) or all of the wireless communication interface 912, the processor 901 and/or the auxiliary controller 919, and the recognition unit 241 and the communication control unit 243 may be implemented in the module. In this case, the above-mentioned module may store a program for causing the processor to function as the recognition unit 241 and the communication control unit 243 (in other words, a program for causing the processor to execute the operation of the recognition unit 241 and the communication control unit 243) and execute the program. As another example, a program for causing the processor to function as the recognition unit 241 and the communication control unit 243 is installed in the smartphone 900, and the wireless communication interface 912 (for example, the BB processor 913), the processor 901, and/or the auxiliary controller 919 may execute the program. As mentioned above, the smartphone 900, the base station device 820, or the above-mentioned module may be provided as the device including the recognition unit 241 and the communication control unit 243, and the program for causing the processor to function as the recognition unit 241 and the communication control unit 243 may be provided. Also, a readable storage medium storing the above-mentioned program may be provided.

Also, in the smartphone 900 illustrated in FIG. 23, the wireless communication unit 220 described, for example, with reference to FIG. 14 may be implemented in the wireless communication interface 912 (for example, the RF circuit 914). Also, the antenna unit 210 may be implemented in the antenna 916.

(Second Application Example)

Figure 24:
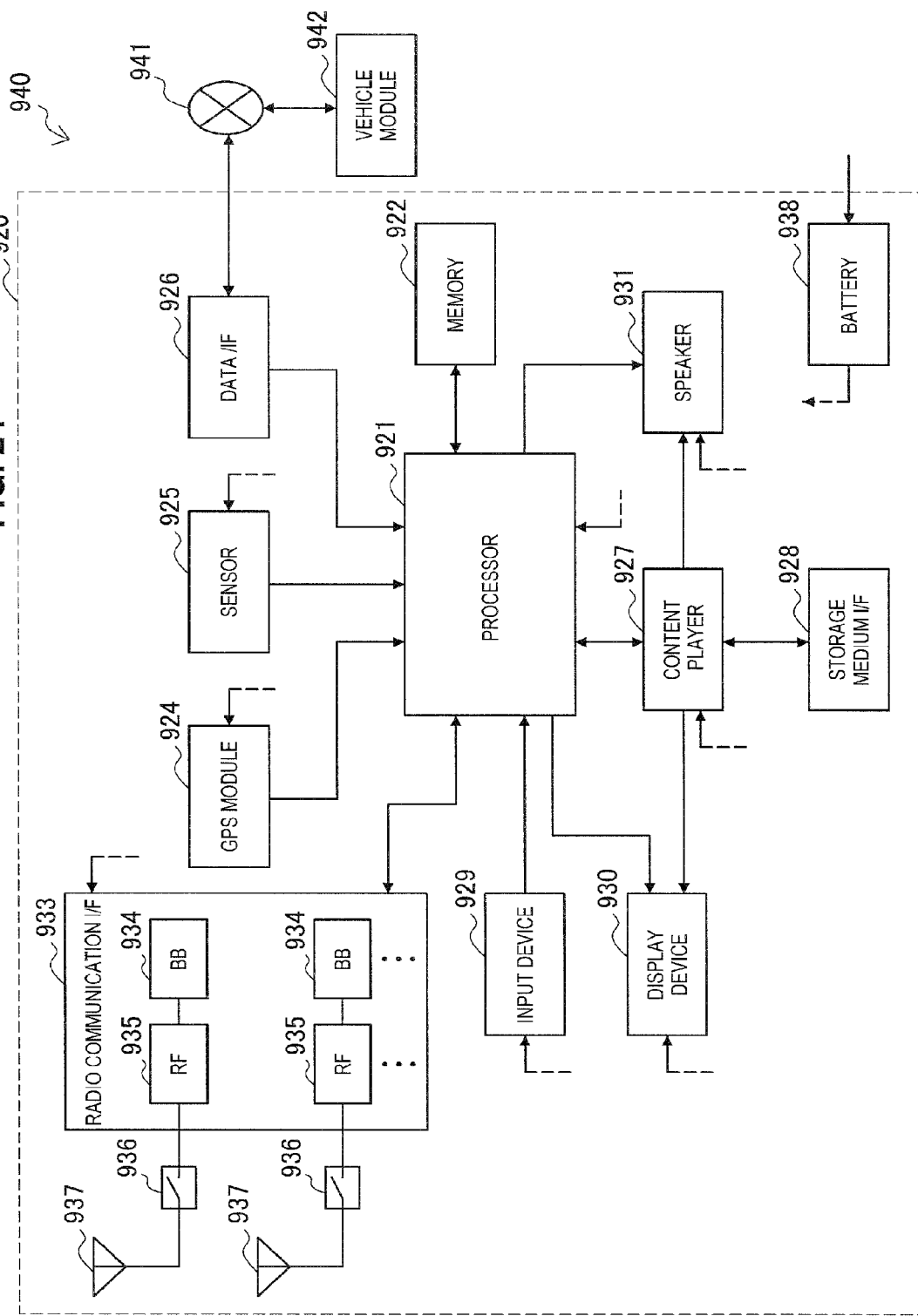
FIG. 24 is a block diagram illustrating an example of a schematic configuration of a car navigation device.

FIG. 24 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 24. Although FIG. 24 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support a radio LAN communication scheme. In that case, the wireless communication interface 933 may include the BB processor 934 and the RF circuit 935 in the radio LAN communication scheme. Furthermore, in addition to a cellular communication scheme, the wireless communication interface 933 may support another type of wireless communication scheme such as a short-distance wireless communication scheme and a near field communication scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 24. Although FIG. 24 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 24 via feeder lines that are partially shown as dashed lines in the figure. The battery 938 accumulates power supplied form the vehicle.

In the car navigation device 920 illustrated in FIG. 24, the recognition unit 241 and the communication control unit 243 described with reference to FIG. 14 may be implemented in the wireless communication interface 933 (for example, the BB processor 934). Alternatively, at least a part of these structural elements may be implemented in the processor 921. As one example, the car navigation device 920 is equipped with a module including a part (for example, the BB processor 934) or all of the wireless communication interface 933, and/or processor 921, and the recognition unit 241 and the communication control unit 243 may be implemented in the module. In this case, the above-mentioned module may store a program for causing the processor to function as the recognition unit 241 and the communication control unit 243 (in other words, a program for causing the processor to execute the operation of the recognition unit 241 and the communication control unit 243) and execute the program. As another example, a program for causing the processor to function as the recognition unit 241 and the communication control unit 243 is installed in the car navigation device 920, and the wireless communication interface 933 (for example, the BB processor 934), and/or the processor 921 may execute the program. As mentioned above, the car navigation device 920, the base station device 820, or the above-mentioned module may be provided as the device including the recognition unit 241 and the communication control unit 243, and the program for causing the processor to function as the recognition unit 241 and the communication control unit 243 may be provided. Also, a readable storage medium storing the above-mentioned program may be provided.

Also, in the car navigation device 920 illustrated in FIG. 24, the wireless communication unit 220 described, for example, with reference to FIG. 14 may be implemented in the wireless communication interface 933 (for example, the RF circuit 935). Also, the antenna unit 210 may be implemented in the antenna 937.

The technology of the present disclosure may also be realized as an in-vehicle system (or a vehicle) 940 including one or more blocks of the car navigation device 920, the in-vehicle network 941, and a vehicle module 942. That is, the in-vehicle system (or the vehicle) 940 may be provided as a device including the recognition unit 241 and the communication control unit 243. The vehicle module 942 generates vehicle data such as vehicle speed, engine speed, and trouble information, and outputs the generated data to the in-vehicle network 941.

<<8. Conclusion>>

The devices and the processes according to the embodiments of the present disclosure have been described with reference to FIGS. 1 to 24.

According to the embodiment of the present disclosure, the base station 100 includes an acquisition unit configured to acquire information indicating a terminal device which is a device candidate for performing cellular communication using a frequency band shared between the cellular communication and wireless LAN communication (that is, a shared band); and a control unit configured to notify the terminal device that the terminal device is the device candidate.

According to the embodiment of the present disclosure, the terminal device 200 includes a recognition unit configured to recognize that a terminal device 200 is a device candidate for performing cellular communication using a frequency band shared between the cellular communication and wireless LAN communication (that is, a shared band) through a notification by the base station 100; and a control unit configured to perform control for using the frequency band in the cellular communication when the terminal device 200 is the device candidate.

Thereby, for example, it is possible to more appropriately use the above-mentioned frequency band (that is, the shared band) in the cellular system 1. Specifically, for example, it is possible to cause the terminal device 200 which is the above-mentioned device candidate to perform an operation for using the above-mentioned shared band in the cellular communication. Also, because a terminal device 200 which is not the above-mentioned device candidate does not perform a special operation, an increase in the number of operations of the terminal device 200 which is not the above-mentioned device candidate can be suppressed.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although an example in which the cellular system is a system conforming to LTE, LTE-Advanced, or a compliant communication scheme has been described, the present disclosure is not limited to such an example. For example, the communication system may be a system conforming to another communication standard.

Also, for example, an example in which other wireless communication different from wireless communication of the cellular system is wireless LAN communication (that is, wireless communication conforming to the wireless LAN standard) has been described, but the present disclosure is not limited to the relevant examples. For example, the above-mentioned other wireless communication may be wireless communication (wireless communication conforming to another communication standard adopting CSMA) other than the wireless LAN communication.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Also, it is possible to create a computer program for causing the processor (for example, a CPU, a DSP, etc.) provided in a device (for example, the base station and/or the terminal device) of the present description to function as the components (for example, the communication control unit) of the above-mentioned device (in other words, a computer program for causing the above-mentioned processor to execute the operation of the components of the above-mentioned device). Also, a storage medium storing the computer program may be provided. Also, a device (for example, a completed product or a module (a component, a processing circuit, a chip, etc.) for a completed product) including a memory that stores the above-mentioned computer program and one or more processors capable of executing the above-mentioned computer program may be provided. Also, a method including the operation of the components of the above-mentioned device (for example, the communication control unit) is included in the technology according to the present disclosure.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)

A device including:

an acquisition unit configured to acquire information indicating a terminal device which is a device candidate for performing wireless communication of a cellular system using a frequency band shared between the wireless communication of the cellular system and wireless communication conforming to a wireless local area network (LAN) standard; and a control unit configured to notify the terminal device that the terminal device is the device candidate.

(2)

The device according to (1), wherein the control unit notifies the terminal device that the terminal device is the device candidate before the frequency band is used in the wireless communication of the cellular system.

(3)

The device according to (1) or (2), wherein the control unit notifies the terminal device that the terminal device is the device candidate using another frequency band for the cellular system.

(4)

The device according to any one of (1) to (3), wherein the control unit notifies the terminal device that the terminal device is the device candidate in a system information block (SIB) or by individual signaling for the terminal device.

(5)

The device according to any one of (1) to (4), wherein the control unit instructs the terminal device to transmit a frame including duration information for setting a network allocation vector (NAV) using the frequency band before the frequency band is used in the wireless communication of the cellular system.

(6)

The device according to (5), wherein the control unit uses another frequency band for the cellular system to instruct the terminal device to transmit the frame using the frequency band.

(7)

The device according to (6), wherein the control unit provides the terminal device with information which specifies a timing at which the frame is transmitted.

(8)

The device according to (6) or (7), wherein the control unit provides the terminal device with the duration information or information which specifies the duration information.

(9)

The device according to (5), wherein the control unit instructs the terminal device to transmit the frame using the frequency band by another frame for triggering the transmission of the frame by the terminal device.

(10)

The device according to any one of (1) to (9), wherein the control unit determines whether to use the frequency band in the wireless communication of the cellular system on the basis of a result of carrier sensing for the frequency band by the terminal device.

(11)

The device according to any one of (1) to (10), wherein the control unit synchronizes wireless communication using another frequency band for the cellular system with wireless communication using the frequency band.

(12)

The device according to any one of (1) to (11), wherein the control unit notifies one or more terminal devices for performing wireless communication of the cellular system of a period in which the wireless communication of the cellular system is performed using the frequency band.

(13)

The device according to (12), wherein the control unit determines the device candidate on the basis of a result of performing measurement for the frequency band by at least some of the one or more terminal devices.

(14)

The device according to any one of (1) to (13), wherein the device is a base station of the cellular system, a base station device of the base station, or a module of the base station device.

(15)

A device including:

a recognition unit configured to recognize that a terminal device is a device candidate for performing wireless communication of a cellular system using a frequency band shared between the wireless communication of the cellular system and wireless communication conforming to a wireless local area network (LAN) standard through a notification by a base station of the cellular system; and a control unit configured to perform control for using the frequency band in the wireless communication of the cellular system when the terminal device is the device candidate.

(16)

The device according to (15), wherein the control includes controlling transmission of a frame by the terminal device so that the frame including duration information for setting a NAV is transmitted using the frequency band.

(17)

The device according to (15) or (16), wherein the control includes notifying the base station of a result of carrier sensing by the terminal device.

(18)

The device according to any one of (15) to (17), wherein the control unit achieves synchronization for the frequency band on the basis of a result of achieving synchronization for another frequency band for the cellular system.

(19)

The device according to any one of (15) to (18), wherein the recognition unit recognizes a period in which the wireless communication of the cellular system is performed using the frequency band through a notification by the base station, and wherein the control unit performs measurement for the frequency band in the period.

(20)

The device according to any one of (15) to (19), wherein the device is the terminal device or a module of the terminal device.

(21)

The device according to any one of (1) to (20), wherein a duplex operation of the cellular system is frequency division duplex (FDD), and wherein the frequency band is used as a downlink band in the cellular system.

(22)

A method including:

acquiring information indicating a terminal device which is a device candidate for performing wireless communication of a cellular system using a frequency band shared between the wireless communication of the cellular system and wireless communication conforming to a wireless local area network (LAN) standard; and notifying, by a processor, the terminal device that the terminal device is the device candidate.

(23)

A program for causing a processor to execute:

acquiring information indicating a terminal device which is a device candidate for performing wireless communication of a cellular system using a frequency band shared between the wireless communication of the cellular system and wireless communication conforming to a wireless local area network (LAN) standard; and notifying the terminal device that the terminal device is the device candidate.

(24)

A readable recording medium having a program recorded thereon, the program causing a processor to execute:

acquiring information indicating a terminal device which is a device candidate for performing wireless communication of a cellular system using a frequency band shared between the wireless communication of the cellular system and wireless communication conforming to a wireless local area network (LAN) standard; and notifying the terminal device that the terminal device is the device candidate.

(25)

A method including:

recognizing that a terminal device is a device candidate for performing wireless communication of a cellular system using a frequency band shared between the wireless communication of the cellular system and wireless communication conforming to a wireless local area network (LAN) standard through a notification by a base station of the cellular system; and performing, by a processor, control for using the frequency band in the wireless communication of the cellular system when the terminal device is the device candidate.

(26)

A program for causing a processor to execute:

recognizing that a terminal device is a device candidate for performing wireless communication of a cellular system using a frequency band shared between the wireless communication of the cellular system and wireless communication conforming to a wireless local area network (LAN) standard through a notification by a base station of the cellular system; and performing control for using the frequency band in the wireless communication of the cellular system when the terminal device is the device candidate.

(27)

A readable recording medium having a program recorded thereon, the program causing a processor to execute:

recognizing that a terminal device is a device candidate for performing wireless communication of a cellular system using a frequency band shared between the wireless communication of the cellular system and wireless communication conforming to a wireless local area network (LAN) standard through a notification by a base station of the cellular system; and performing control for using the frequency band in the wireless communication of the cellular system when the terminal device is the device candidate.

(28)

A device including: a control unit configured to notify one or more terminal devices for performing wireless communication of a cellular system of a period in which the wireless communication of the cellular system is performed using a frequency band shared between the wireless communication of the cellular system and wireless communication conforming to a wireless local area network (LAN) standard.

(29)

A method including: notifying, by a processor, one or more terminal devices for performing wireless communication of a cellular system of a period in which the wireless communication of the cellular system is performed using a frequency band shared between the wireless communication of the cellular system and wireless communication conforming to a wireless local area network (LAN) standard.

(30)

A program for causing a processor to execute: notifying one or more terminal devices for performing wireless communication of a cellular system of a period in which the wireless communication of the cellular system is performed using a frequency band shared between the wireless communication of the cellular system and wireless communication conforming to a wireless local area network (LAN) standard.

(31)

A readable recording medium having a program recorded thereon, the program causing a processor to execute: notifying one or more terminal devices for performing wireless communication of a cellular system of a period in which the wireless communication of the cellular system is performed using a frequency band shared between the wireless communication of the cellular system and wireless communication conforming to a wireless local area network (LAN) standard.

(32)

A device including: a recognition unit configured to recognize a period in which wireless communication of a cellular system is performed using a frequency band shared between the wireless communication of the cellular system and wireless communication conforming to a wireless local area network (LAN) standard through a notification by a base station of the cellular system; and a control unit configured to perform measurement for the frequency band in the period.

(33)

A method including: recognizing a period in which wireless communication of a cellular system is performed using a frequency band shared between the wireless communication of the cellular system and wireless communication conforming to a wireless local area network (LAN) standard through a notification by a base station of the cellular system; and performing, by a processor, measurement for the frequency band in the period.

(34)

A program for causing a processor to execute: recognizing a period in which wireless communication of a cellular system is performed using a frequency band shared between the wireless communication of the cellular system and wireless communication conforming to a wireless local area network (LAN) standard through a notification by a base station of the cellular system; and performing measurement for the frequency band in the period.

(35)

A readable recording medium having a program recorded thereon, the program causing a processor to execute: recognizing a period in which wireless communication of a cellular system is performed using a frequency band shared between the wireless communication of the cellular system and wireless communication conforming to a wireless local area network (LAN) standard through a notification by a base station of the cellular system; and performing measurement for the frequency band in the period.

REFERENCE SIGNS LIST 1 cellular system
10 cell
30 access point
40 communication area
50 terminal device
100 base station
151 information acquisition unit
153 communication control unit
200 terminal device
241 recognition unit
243 communication control unit

The invention claimed is:
1. A device comprising:
circuitry including at least a processor and a memory, the circuitry configured to:
acquire information indicating a terminal device which is a device candidate for performing a wireless communication of a cellular system using a frequency band shared between the wireless communication of the cellular system and another wireless communication conforming to a wireless local area network (LAN) standard;

notify the terminal device that the terminal device is the device candidate, wherein the terminal device performs a carrier sensing for the frequency band and report a result of the carrier sensing to the device;
determine whether or not to use the frequency band based on the result from the terminal device; and
execute a carrier sensing for the frequency band and transmit a request-to-send (RTS) frame to the terminal device when a period, in which no signal is transmitted using the frequency band, becomes inter-frame space and a back-off time.

2. The device according to claim 1, wherein the circuitry is further configured to notify the terminal device that the terminal device is the device candidate before the frequency band is used in the wireless communication of the cellular system.

3. The device according to claim 1, wherein the circuitry is further configured to notify the terminal device that the terminal device is the device candidate using another frequency band for the cellular system.

4. The device according to claim 1, wherein the circuitry is further configured to notify the terminal device that the terminal device is the device candidate in a system information block (SIB) or by an individual signaling for the terminal device.

5. The device according to claim 1, wherein the circuitry is further configured to instruct the terminal device to transmit a frame including duration information for setting a network allocation vector (NAV) using the frequency band before the frequency band is used in the wireless communication of the cellular system.

6. The device according to claim 5, wherein the circuitry is further configured to use another frequency band for the cellular system to instruct the terminal device to transmit the frame using the frequency band.

7. The device according to claim 6, wherein the circuitry is further configured to provide the terminal device with information which specifies a timing at which the frame is transmitted.

8. The device according to claim 6, wherein the circuitry is further configured to provide the terminal device with the duration information or information which specifies the duration information.

9. The device according to claim 5, wherein the circuitry is further configured to provide the terminal device to transmit the frame using the frequency band by another frame for triggering the transmission of the frame by the terminal device.

10. The device according to claim 1, wherein the circuitry is further configured to determine whether to use the frequency band in the wireless communication of the cellular system based on a result of the carrier sensing for the frequency band by the terminal device.

11. The device according to claim 1, wherein the circuitry is further configured to synchronize another wireless communication using another frequency band for the cellular system with the wireless communication using the frequency band.

12. The device according to claim 1, wherein the circuitry is further configured to notify one or more terminal devices for performing the wireless communication of the cellular system for a period in which the wireless communication of the cellular system is performed using the frequency band.

13. The device according to claim 12, wherein the circuitry is further configured to determine the device candidate based on a result of a measurement performed for the frequency band by at least some of the one or more terminal devices.

14. The device according to claim 1, wherein the device is a base station of the cellular system, a base station device of the base station, or a module of the base station device.

15. A device comprising:
circuitry including at least a processor and a memory, the circuitry configured to:
recognize that a terminal device is a device candidate for performing a wireless communication of a cellular system using a frequency band shared between the wireless communication of the cellular system and another wireless communication conforming to a wireless local area network (LAN) standard through a notification by a base station of the cellular system; and
control for using the frequency band in the wireless communication of the cellular system when the terminal device is the device candidate, wherein
the terminal device performs a carrier sensing for the frequency band and report a result of the carrier sensing to the base station,
the base station determines whether or not to use the frequency band based on the result from the terminal device and executes a carrier sensing for the frequency band and transmit a request-to-send (RTS) frame to the terminal device when a period, in which no signal is transmitted using the frequency band, becomes inter-frame space and a back-off time.

16. The device according to claim 15, wherein the circuitry is further configured to include controlling transmission of a frame by the terminal device so that the frame including duration information for setting a NAV is transmitted using the frequency band.

17. The device according to claim 15, wherein the circuitry is further configured to include notifying the base station of a result of the carrier sensing by the terminal device.

18. The device according to claim 15, wherein the circuitry is further configured to achieve synchronization for the frequency band based on a result of achieving synchronization for another frequency band for the cellular system.

19. The device according to claim 15, wherein the circuitry recognizes a period in which the wireless communication of the cellular system is performed using the frequency band through a notification by the base station, the circuitry is further configured to measure for the frequency band in the period.

20. The device according to claim 15, wherein the device is the terminal device or a module of the terminal device.

21. The device according to claim 1,
wherein a duplex operation of the cellular system is frequency division duplex (FDD), and
wherein the frequency band is used as a downlink band in the cellular system.

22. A terminal device comprising:
circuitry including at least a processor and a memory, the circuitry configured to:
receive information that the terminal device is a device candidate for performing a wireless communication of a cellular system using a frequency band shared between the wireless communication of the cellular system and another wireless communication conforming to a wireless local area network (LAN) standard through a notification by a base station of the cellular system;

receive duration information which specifies a period in which a wireless communication of the cellular system is performed using the frequency band through the notification by the base station;

perform a carrier sensing for the frequency band in at least a part of the period; and report a result of the carrier sensing to the base station, wherein the frequency band is used for a secondary component carrier, and another frequency band for a cellular communication is used as a primary component carrier, for the wireless communication of the cellular system.

23. The terminal device according to claim 22, wherein the circuitry is further configured to receive a request-to-send (RTS) frame from the base station when a period, in which no signal is transmitted using the frequency band, becomes inter-frame space and a back-off time, wherein the other device determines whether or not to use the frequency band based on the result from the terminal device and performs a carrier sensing for the frequency band before sending the RTS frame to the terminal device.

24. The terminal device according to claim 22, wherein the circuitry is further configured to measure for the frequency band in the period in which the wireless communication of the cellular system is performed using the frequency band.

25. The terminal device according to claim 24, wherein a reference signal received power (RSRP) of the frequency band or a reference signal received quality (RSRQ) of the frequency band is measured.

26. The terminal device according to claim 22, wherein the circuitry is further configured to report the result of the carrier sensing to the base station, the result indicating whether a signal is transmitted using the frequency band.

* * * * *